United States Patent
Matsueda et al.

(10) Patent No.: US 9,358,535 B2
(45) Date of Patent: Jun. 7, 2016

(54) EXHAUST GAS-PURIFYING CATALYST

(75) Inventors: Satoshi Matsueda, Kakegawa (JP); Akimasa Hirai, Kakegawa (JP); Kenichi Taki, Kakegawa (JP); Keiichi Narita, Kakegawa (JP); Asuka Hori, Kakegawa (JP); Masahiro Kusaka, Kakegawa (JP)

(73) Assignee: CATALER CORPORATION, Shizuoka (JP)

( * ) Notice: Subject to any disclaimer, the term of this patent is extended or adjusted under 35 U.S.C. 154(b) by 0 days.

(21) Appl. No.: 13/356,158

(22) Filed: Jan. 23, 2012

(65) Prior Publication Data

US 2012/0122667 A1    May 17, 2012

Related U.S. Application Data

(63) Continuation of application No. PCT/JP2010/062374, filed on Jul. 22, 2010.

(30) Foreign Application Priority Data

Jul. 24, 2009   (JP) ................. 2009-173115

(51) Int. Cl.
*B01J 23/44* (2006.01)
*B01J 35/00* (2006.01)
(Continued)

(52) U.S. Cl.
CPC ............ *B01J 35/002* (2013.01); *B01D 53/945* (2013.01); *B01J 23/002* (2013.01); *B01J 23/63* (2013.01);
(Continued)

(58) Field of Classification Search
CPC .................. B01J 23/42; B01J 23/44
USPC .......... 502/305, 309, 334, 333, 339, 350
See application file for complete search history.

(56) References Cited

U.S. PATENT DOCUMENTS 6,475,951 B1 * 11/2002 Domesle et al. ............ 502/325
6,602,479 B2 *  8/2003 Taniguchi et al. ......... 423/239.1
(Continued)

FOREIGN PATENT DOCUMENTS

CN    101108345 A    1/2008
JP    63-116741 A    5/1988
(Continued)

OTHER PUBLICATIONS

International Search Report mailed by the International Searching Authority (ISA/JP) on Nov. 9, 2010 in connection with PCT International Application No. PCT/JP2010/062374, filed Jul. 22, 2010.
Written Opinion of the International Searching Authority mailed by the International Searching Authority (ISA/JP) on Nov. 9, 2010 in connection with PCT International Application No. PCT/JP2010/062374, filed Jul. 22, 2010.
(Continued)

*Primary Examiner* — Kaj K Olsen
*Assistant Examiner* — James Fiorito
(74) *Attorney, Agent, or Firm* — John P. White; Cooper & Dunham LLP

(57) ABSTRACT

An exhaust gas-purifying catalyst includes first particles of oxygen storage material, second particles of one or more acidic oxides interposed between the first particles, and third particles of one or more precious metal elements interposed between the first particles, wherein a spectrum of a characteristic X-ray intensity for one of constituent elements of the acidic oxide(s) other than oxygen and a spectrum of a characteristic X-ray intensity for one of the precious metal element(s) that are obtained by performing a line analysis using energy-dispersive X-ray spectrometry along a length of 500 nm have a correlation coefficient of 0.70 or more.

12 Claims, 4 Drawing Sheets

(51) Int. Cl.
*B01D 53/94* (2006.01)
*B01J 23/00* (2006.01)
*B01J 23/63* (2006.01)
*B01J 23/652* (2006.01)
*B01J 35/02* (2006.01)
*B01J 37/00* (2006.01)
*B01J 37/02* (2006.01)
*B01J 37/03* (2006.01)
*B01J 23/42* (2006.01)

(52) U.S. Cl.
CPC ............ *B01J 23/6527* (2013.01); *B01J 35/023* (2013.01); *B01J 37/0009* (2013.01); *B01J 37/0201* (2013.01); *B01J 37/03* (2013.01); *B01D 2255/1021* (2013.01); *B01D 2255/1023* (2013.01); *B01D 2255/2061* (2013.01); *B01D 2255/2063* (2013.01); *B01D 2255/20707* (2013.01); *B01D 2255/20776* (2013.01); *B01D 2255/30* (2013.01); *B01D 2255/407* (2013.01); *B01D 2255/908* (2013.01); *B01J 23/42* (2013.01); *B01J 23/44* (2013.01); *B01J 2523/00* (2013.01); *F01N 2370/02* (2013.01)

(56) References Cited

U.S. PATENT DOCUMENTS

2005/0282701 A1* 12/2005 Foong et al. .................. 502/304
2007/0225159 A1*  9/2007 Ibe et al. ....................... 502/304

FOREIGN PATENT DOCUMENTS

| | | |
|---|---|---|
| JP | 1-242149 A | 9/1989 |
| JP | 09-248457 A | 9/1997 |
| JP | 10-202101 A | 8/1998 |
| JP | 2005-349383 A | 12/2005 |
| JP | 2007-000773 A | 1/2007 |
| JP | 2007-098200 A | 4/2007 |
| JP | 2009-106856 A | 5/2009 |
| JP | 2009-247984 A | 10/2009 |
| WO | WO 2007/119658 A1 | 10/2007 |

OTHER PUBLICATIONS

Chinese official action (including English translation thereof) mailed on Apr. 18, 2013 by the Chinese Patent Office, in connection with Chinese Patent Application No. 201080033121.6.

Japanese official action (including English translation thereof) mailed on Jan. 7, 2014 by the Japanese Patent Office in connection with Japanese Patent Application No. 2011-523688.

* cited by examiner

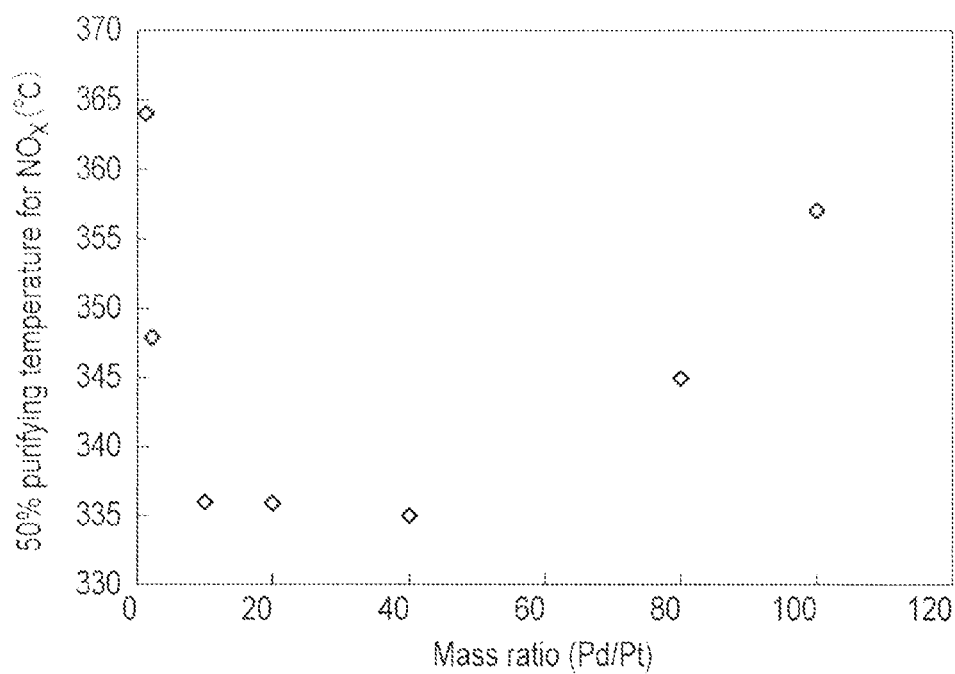
F I G. 5
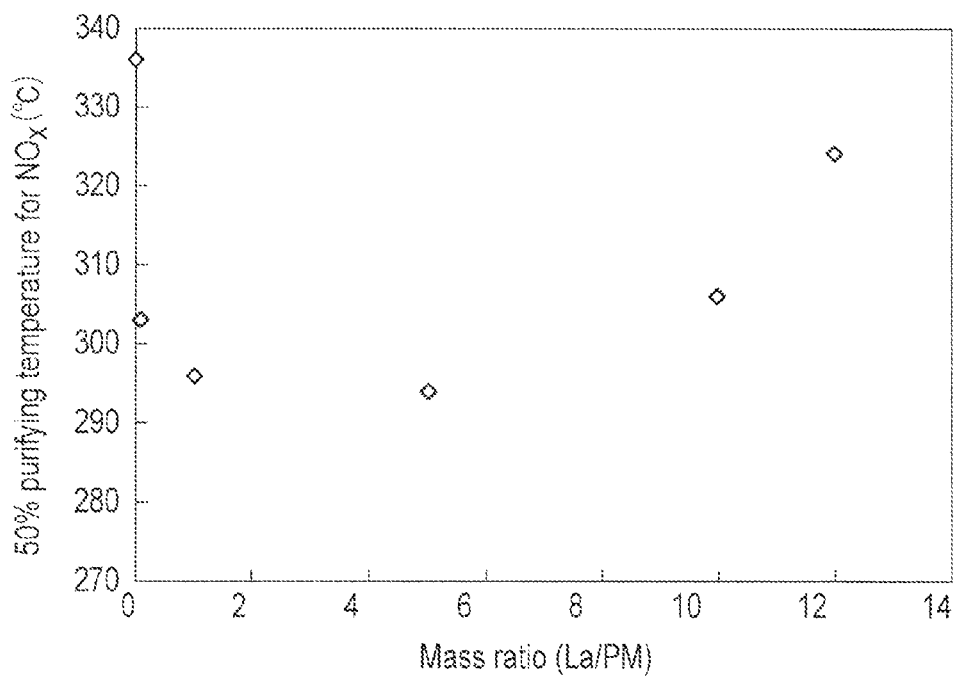
F I G. 6

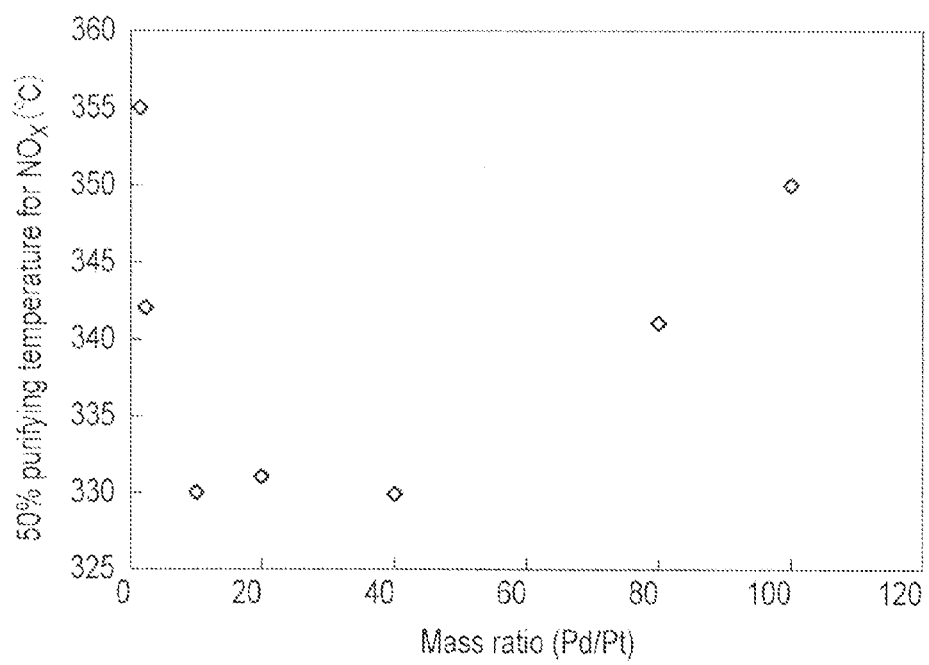
F I G. 7
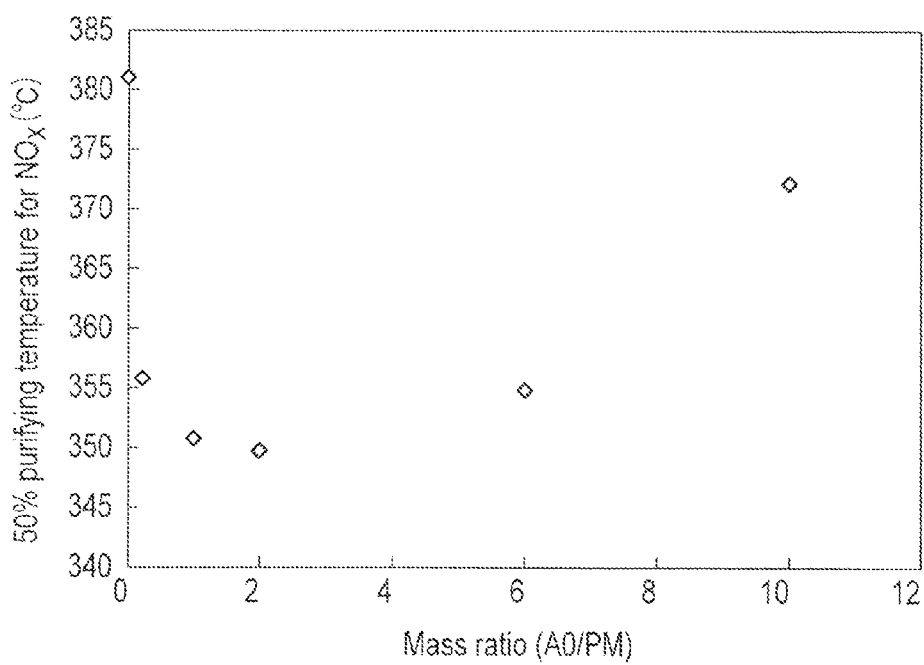
F I G. 8

EXHAUST GAS-PURIFYING CATALYST

CROSS REFERENCE TO RELATED APPLICATIONS

This application is a Continuation Application of PCT Application No. PCT/JP2010/062374, filed Jul. 22, 2010 and based upon and claiming the benefit of priority from prior Japanese Patent Application No. 2009-173115, filed Jul. 24, 2009, the entire contents of all of which are incorporated herein by reference.

BACKGROUND OF THE INVENTION

1. Field of the Invention

The present invention relates to an exhaust gas-purifying catalyst.

2. Description of the Related Art

Many automotive vehicles such as automobiles are equipped with a three-way catalyst as an exhaust gas-purifying catalyst. The three-way catalyst contains precious metals as catalytic metals. The precious metals promote the oxidation reactions of hydrocarbons (HC) and carbon monoxide (CO) and the reductive reactions of nitrogen oxides ($NO_X$).

Jpn. Pat. Appln. KOKAI Publication Nos. 63-116741, 01-242149, and 10-202101 describe exhaust gas-purifying catalysts containing a composite oxide of cerium oxide and zirconium oxide and a precious metal supported by the composite oxide. In these exhaust gas-purifying catalysts, the composite oxide is an oxygen storage material having an oxygen storage capacity. The oxygen storage material can optimize the above-described reductive reactions and oxidation reactions.

BRIEF SUMMARY OF THE INVENTION

When a mixture of, for example, an acidic oxide and the composite oxide supporting a precious metal is used in the above-described exhaust gas-purifying catalysts, poisoning of the precious metal by sulfur can be suppressed. The present inventors, however, believed that there was a possibility to improve the performance of such an exhaust gas-purifying catalyst in purifying $NO_X$ after a long-term use.

Thus, an object of the present invention is to provide a technique that is advantageous in improving $NO_X$-purifying performance after a long-term use.

According to an aspect of the present invention, there is provided an exhaust gas-purifying catalyst comprising first particles of oxygen storage material, second particles of one or more acidic oxides interposed between the first particles, and third particles of one or more precious metal elements interposed between the first particles, wherein a spectrum of a first characteristic X-ray intensity for one of constituent elements of the one or more acidic oxides other than oxygen and a spectrum of a second characteristic X-ray intensity for one of the one or more precious metal elements that are obtained by performing a line analysis using energy-dispersive X-ray spectrometry along a length of 500 nm have a correlation coefficient σ(AO,PM) of 0.70 or more, the coefficient σ(AO,PM) being calculated from an equation:

$$\sigma(AO, PM) = \frac{\frac{1}{25} \times \sum_{n=1}^{25} [\{I_{AO}(n) - I_{AO}(Av)\} \times \{I_{PM}(n) - I_{PM}(Av)\}]}{\frac{1}{25} \times \sum_{n=1}^{25} [\{I_{AO}(n) - I_{AO}(Av)\}] \times \frac{1}{25} \times \sum_{n=1}^{25} [\{I_{PM}(n) - I_{PM}(Av)\}]}$$

in which $I_{AO}(Av)$ and $I_{PM}(Av)$ are mean values of the first and second characteristic X-ray intensities obtained along a length of 500 nm, respectively, and $I_{AO}(n)$ and $I_{PM}(n)$ are a mean value of the first characteristic X-ray intensity and a mean value of the second characteristic X-ray intensity that are obtained for an n-th interval of 25 intervals arranged in a line and each having a length of 20 nm, respectively.

BRIEF DESCRIPTION OF THE SEVERAL VIEWS OF THE DRAWING

FIG. 5 is a graph showing an example of influence that a mass ratio of palladium to platinum exerts on the $NO_X$-purifying performance after an endurance test;

FIG. 6 is a graph showing an example of influence that a mass ratio of a rare-earth element other than cerium to a precious metal exerts on the $NO_X$-purifying performance after an endurance test;

FIG. 7 is a graph showing another example of influence that a mass ratio of palladium to platinum exerts on the $NO_X$-purifying performance after an endurance test; and FIG. 8 is a graph showing an example of influence that a mass ratio of an acidic oxide to a precious metal exerts on the $NO_X$-purifying performance after an endurance test.

DETAILED DESCRIPTION OF THE INVENTION

Figure 1:
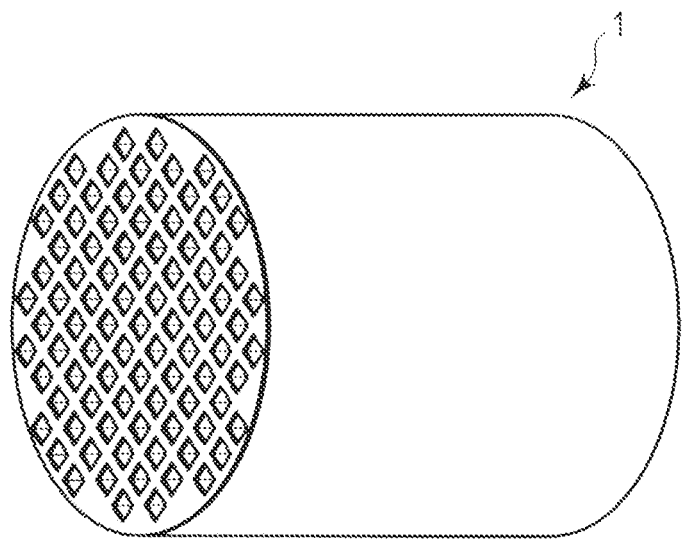
FIG. 1 is a perspective view schematically showing an exhaust gas-purifying catalyst according to an embodiment of the present invention.

Embodiments of the present invention will be described below with reference to the drawings. In the drawings, the same reference symbols denote components having the same or similar functions and duplicate descriptions will be omitted.

Figure 2:
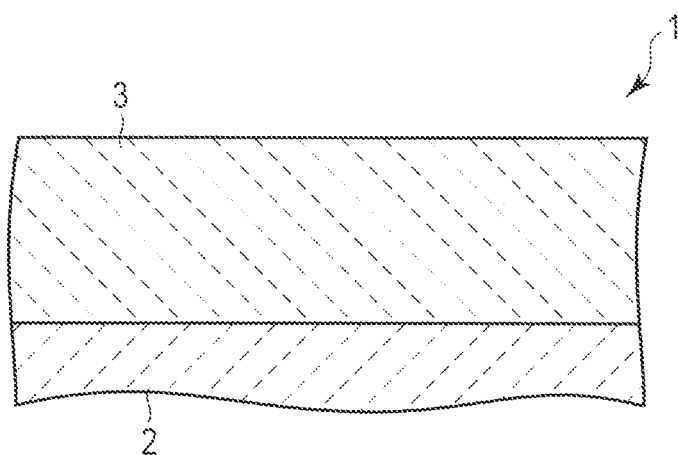
FIG. 2 is an enlarged cross-sectional view schematically showing a part of the exhaust gas-purifying catalyst shown in FIG. 1.
Figure 3:
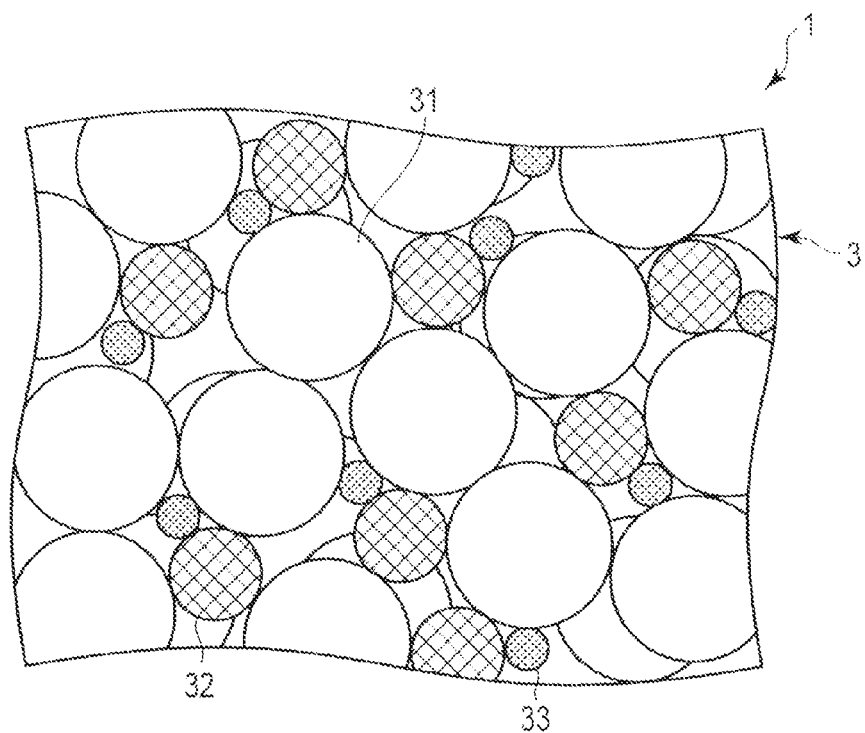
FIG. 3 is an enlarged cross-sectional view schematically showing a part of the exhaust gas-purifying catalyst shown in FIG. 1 at a higher magnification.

FIG. 1 is a perspective view schematically showing an exhaust gas-purifying catalyst according to an embodiment of the present invention. FIG. 2 is an enlarged cross-sectional view schematically showing a part of the exhaust gas-purifying catalyst shown in FIG. 1. FIG. 3 is an enlarged cross-sectional view schematically showing a part of the exhaust gas-purifying catalyst shown in FIG. 1 at a higher magnification.

The exhaust gas-purifying catalyst 1 shown in FIGS. 1 to 3 is a monolith catalyst. The exhaust gas-purifying catalyst 1 includes a substrate 2 such as a monolith honeycomb substrate. Typically, the substrate 2 is made of ceramic such as cordierite.

A catalytic layer 3 is formed on the partition walls of the substrate 2. The catalytic layer 3 includes first particles 31, second particles 32, and third particles 33.

The first particles 31 are evenly dispersed in the catalytic layer 3. Each of the particles 31 is made of an oxygen storage material. The oxygen storage material stores oxygen under an oxygen-rich condition and emits oxygen under an oxygen-lean condition so as to optimize the oxidation reactions of HC and CO and the reductive reactions of $NO_X$.

The oxygen storage material is, for example, ceria, a composite oxide of ceria with another metal oxide, or a mixture thereof. As the composite oxide, for example, a composite oxide of ceria and zirconia can be used.

The average particle diameter of the particles 31 falls within, for example, a range of 0.005 μm to 0.1 μm, typically a range of 0.01 μm to 0.03 μm. Note that the "average particle diameter" is the average particle diameter of primary particles described later and means the value obtained by the following method.

Firstly, a part of the catalytic layer 3 is removed from the exhaust gas-purifying catalyst 1. Next, using a scanning electron microscope (SEM), an SEM image of this sample is taken at a 50,000 to 200,000-fold magnification. Then, the particles in full view are selected from the oxygen storage material in the SEM image, and the area is obtained for each of the selected particles. Subsequently, diameters of circles having the same areas as the above-described areas are calculated, and an arithmetic mean of the diameters is obtained. The arithmetic mean is stated as the average particle diameter.

The second particles 32 are made of acidic oxide(s). The acidic oxides suppress poisoning of precious metals by sulfur. The particles 32 may include only one acidic oxide or two or more acidic oxides. As the acidic oxide, for example, titanium oxide, silicon oxide or tungsten oxide can be used.

The particles 32 are supported by the first particles 31 and positioned among the particles 31. Typically, the particles 32 are homogeneously mixed with the particles 31. For example, the particles 31 and 32 form a homogeneous mixture with almost no aggregate constituted only by either of them. That is, for example, almost no secondary particle constituted only by an oxygen storage material and almost no secondary particle constituted only by acidic oxide(s) are present, and primary particles made of an oxygen storage material and primary particles made of acidic oxide(s) form a homogeneous mixture in the catalytic layer 3.

A ratio of mass of the particles 32 to mass of the catalytic layer 3 or total mass of the particles 31 to 34 falls within, for example, a range of 0.1% to 5% by mass, and typically a range of 0.1% to 3% by mass. A ratio of mass of the particles 32 to mass of the particles 33 falls within, for example, a range of 0.2 to 10, and typically a range of 0.2 to 6. In the case where the mass ratios are set within the above-described ranges, HC- and $NO_X$-purifying performances after a long-term use can be improved as compared with the case where the mass ratios are set outside the above-described ranges.

The average particle diameter of the particles 32 falls within, for example, a range of 0.005 μm to 0.050 μm, typically a range of 0.01 μm to 0.02 μm. Note that the "average particle diameter" is the average particle diameter of the above-described "primary particles" and means the value obtained by the same method as that described for the average particle diameter of the oxygen storage material.

The third particles 33 are made of precious metal(s). Each particle 33 is supported by at least one of the particles 31 and 32 and positioned among the particles 31. Typically, the particles 33 are homogeneously mixed with the particles 31. For example, the particles 31 and 33 form a homogeneous mixture with almost no aggregate constituted only by either of them. That is, for example, almost no secondary particle constituted only by an oxygen storage material and almost no secondary particle constituted only by precious metal(s) are present, and primary particles made of an oxygen storage material and primary particles made of precious metal(s) form a homogeneous mixture in the catalytic layer 3.

The precious metal elements promote the oxidation reactions of HC ad CO and the reductive reactions of $NO_X$. In addition, the precious metal elements supported by the oxygen storage material increase the oxygen storage capacity of the oxygen storage material.

The precious metal element(s) is, for example, platinum group element(s) such as palladium, platinum and rhodium. The particles 33 may include only one precious metal element or two or more precious metal elements. For example, the particles 33 may include only palladium or a mixture of palladium and platinum as the precious metal element(s).

In the case where the particles are made of a mixture of palladium and platinum, a mass ratio of palladium to platinum is set within, for example, a range of 2 to 80, and typically a range of 10 to 4. In the case where the mass ratio of palladium to platinum is set within the above-described range, HC- and $NO_X$-purifying performances after a long-term use can be improved as compared with the case where the mass ratio is set outside the above-described range.

The particles 33 have an average particle diameter smaller than the average particle diameter of the particles 31. The average particle diameter of the particles 33 falls within, for example, a range of 0.5 nm to 10 nm, and typically a range of 1 nm to 5 nm. Note that the "average particle diameter" is the average particle diameter of the above-described "primary particles" and means the value obtained by the same method as that described for the average particle diameter of the oxygen storage material.

In the case where the particles 32 and 33 are homogeneously mixed with the particles 31, the particles 31 to 33 form, for example, a homogeneous mixture with almost no aggregate constituted by only one of them. That is, for example, almost no secondary particle constituted only by an oxygen storage material, almost no secondary particle constituted only by acidic oxide(s), and almost no secondary particle constituted only by precious metal(s) are present, and primary particles made of an oxygen storage material, primary particles made of acidic oxide(s) and primary particles made of precious metal(s) form a homogeneous mixture in the catalytic layer 3.

In the catalytic layer 3 of the exhaust gas-purifying catalyst 1, the particles 31 to 33 are dispersed with a relatively high uniformity. Specifically, when a line analysis using energy-dispersive X-ray spectrometry is performed along a length of 500 nm on the catalytic layer 3, a spectrum of a first characteristic X-ray intensity for one of the elements other than oxygen contained in the acidic oxide(s) and a spectrum of a second characteristic X-ray intensity for one of the precious metal element(s) have a correlation coefficient $\sigma(AO,PM)$ of 0.70 or more. In the case where the particles 32 include two or more acidic oxides or the particles 33 include two or more precious metal elements, typically, for all the combinations of the elements of the particles 33 other than oxygen and the precious metal elements of the particles 33, the spectra of the first and second characteristic X-ray intensities have a correlation coefficient $\sigma(AO,PM)$ of 0.70 or more.

Here, the correlation coefficient σ(AO,PM) is the value calculated from the following equation (1).

$$\sigma(AO, PM) = \frac{\frac{1}{25} \times \sum_{n=1}^{25} [\{I_{AO}(n) - I_{AO}(Av)\} \times \{I_{PM}(n) - I_{PM}(Av)\}]}{\frac{1}{25} \times \sum_{n=1}^{25} [\{I_{AO}(n) - I_{AO}(Av)\}] \times \frac{1}{25} \times \sum_{n=1}^{25} [\{I_{PM}(n) - I_{PM}(Av)\}]} \quad (1)$$

In the equation (1), $I_{AO}(Av)$ and $I_{PM}(Av)$ are mean values of the first and second characteristic X-ray intensities obtained along a length of 500 nm, respectively. $I_{AO}(n)$ and $I_{PM}(n)$ are a mean value of the first characteristic X-ray intensity and a mean value of the second characteristic X-ray intensity, respectively, which are obtained for an n-th interval of 25 intervals arranged in a line and each having a length of 20 nm.

The line analysis using energy-dispersive X-ray spectrometry may be performed on a surface of the catalytic layer 3 or a cross section of the catalytic layer 3. In the latter case, the direction of the line analysis may be the thickness direction or a direction perpendicular to the thickness direction.

As described above, the particles 31 and 33 are distributed in the catalytic layer 3 with a relatively high uniformity. Thus, in this catalytic layer 3, a large proportion of the particles 33 are the ones that are positioned near the particles 32. Therefore, poisoning of the precious metal(s) by sulfur can be suppressed effectively.

Also, in the catalytic layer 3, a probability that a particle 31 exists between adjacent particles 32 and a probability that a particle 31 exists between adjacent particles 33 are high. Thus, sintering of the particles 31 and 32 is less prone to occur.

Therefore, the exhaust gas-purifying catalyst 1 can offer excellent HC- and $NO_X$-purifying performances for a long period of time.

Various modifications can be made to the above-described exhaust gas-purifying catalyst 1.

Figure 4:
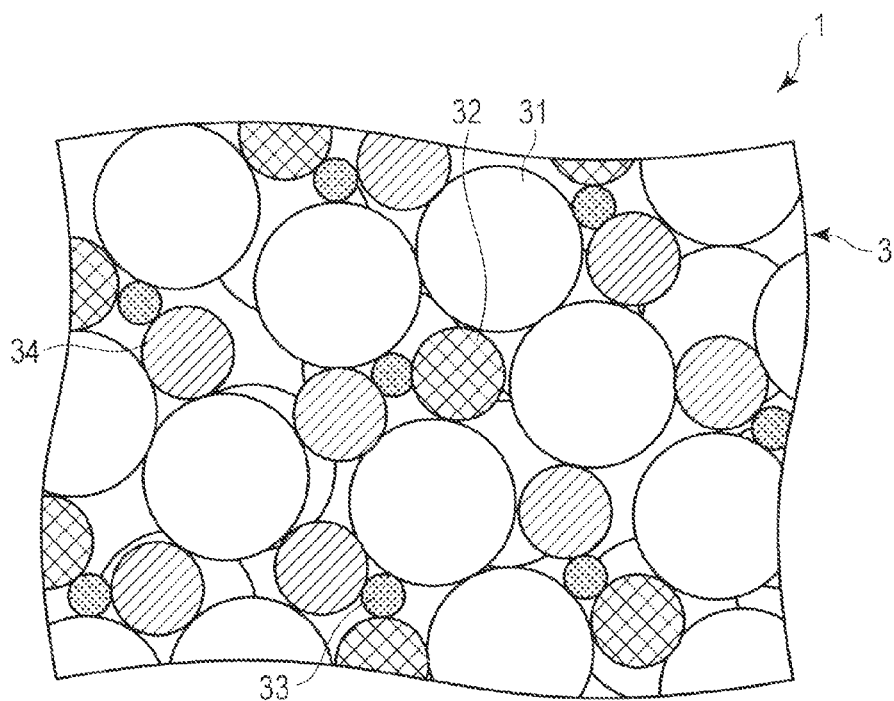
FIG. 4 is an enlarged cross-sectional view schematically showing a part of an exhaust gas-purifying catalyst according to a modified example.

FIG. 4 is an enlarged cross-sectional view schematically showing a part of an exhaust gas-purifying catalyst according to a modified example.

The exhaust gas-purifying catalyst 1 shown in FIG. 4 is the same as the exhaust gas-purifying catalyst 1 described with reference to FIGS. 1 to 3 except that the catalytic layer 3 further includes fourth particles 34.

The fourth particles 34 are made of rare-earth element(s) other than cerium and/or compound(s) thereof. The particles 34 may include only one rare-earth element other than cerium or two or more rare-earth elements other than cerium. Alternatively, the particles 34 may include only one compound of a rare-earth element other than cerium compounds or two or more compounds of rare-earth element(s) other than cerium compounds. Alternatively, the particles 34 may be a mixture of one or more rare-earth elements other than cerium and one or more compounds of rare-earth element(s) other than cerium compounds. As the rare-earth element other than cerium, for example, lanthanum or neodymium can be used.

The rare-earth element(s) other than cerium and/or compound(s) thereof promote the steam-reforming and water-gas shift reactions. Hydrogen produced by the reactions can be utilized for purifying $NO_X$. Note that the oxygen storage capacity of the particles is lower than that of the particles 31. Typically, the particles 34 have no oxygen storage capacity.

The fourth particles 34 are supported by the first particles 31 and each positioned among the particles 31. Typically, the particles 34 are homogeneously mixed with the particles 31. For example, the particles 31 and 34 form a homogeneous mixture with almost no aggregate constituted only by either of them. That is, for example, almost no secondary particle constituted only by an oxygen storage material and almost no secondary particle constituted only by rare-earth element(s) other than cerium and/or compound(s) thereof are present, and primary particles made of an oxygen storage material and primary particles made of rare-earth element(s) other than cerium and/or compound(s) thereof form a homogeneous mixture in the catalytic layer 3.

A ratio of mass of the rare-earth element(s) contained in the particles 34 to mass of the catalytic layer 3 or total mass of the particles 31 to 34 falls within, for example, a range of 0.1% to 12% by mass, and typically a range of 0.1% to 10% by mass. A ratio of mass of the rare-earth element(s) contained in the particles 34 to mass of the particles 33 falls within, for example, a range of 0.1 to 12, and typically a range of 0.1 to 10. In the case where the mass ratios are set within the above-described ranges, HC- and $NO_X$-purifying performances after a long-term use can be improved as compared with the case where the mass ratios are set outside the above-described ranges.

The average particle diameter of the particles 34 falls within, for example, a range of 0.005 μm to 0.050 μm, and typically a range of 0.01 μm to 0.02 μm. Note that the "average particle diameter" is the average particle diameter of the above-described "primary particles" and means the value obtained by the same method as that described for the average particle diameter of the oxygen storage material.

In the catalytic layer 3 of the exhaust gas-purifying catalyst 1, the particles 31 to 34 are dispersed with a relatively high uniformity.

Specifically, when a line analysis using energy-dispersive X-ray spectrometry is performed along a length of 500 nm on the catalytic layer 3, a spectrum of a first characteristic X-ray intensity for one of the elements other than oxygen contained in the acidic oxide(s) and a spectrum of a second characteristic X-ray intensity for one of the precious metal element(s) have a correlation coefficient σ(AO,PM) of 0.70 or more. In the case where the particles 32 include two or more acidic oxides or the particles 33 include two or more precious metal elements, typically, for all the combinations of the elements of the particles 33 other than oxygen and the precious metal elements of the particles 33, the spectra of the first and second characteristic X-ray intensities have a correlation coefficient σ(AO,PM) of 0.70 or more.

Further, a spectrum of a third characteristic X-ray intensity for one of the rare-earth element(s) other than cerium and a spectrum of a second characteristic X-ray intensity for one of the precious metal element(s) have a correlation coefficient σ(RE, PM) of, for example, 0.68 or more, and typically 0.70 or more. In the case where the particles 34 include two or more rare-earth elements other than cerium or the particles 33 include two or more precious metal elements, typically, for all the combinations of the rare-earth elements other than cerium and the precious metal elements, the spectra of the second and third characteristic X-ray intensities have a correlation coefficient σ(RE, PM) of, for example 0.68 or more, and typically 0.70 or more.

Here, the correlation coefficient σ(RE, PM) is the value calculated from the following equation (2).

$$\sigma(RE, PM) = \frac{\frac{1}{25} \times \sum_{n=1}^{25} [\{I_{RE}(n) - I_{RE}(Av)\} \times \{I_{PM}(n) - I_{PM}(Av)\}]}{\frac{1}{25} \times \sum_{n=1}^{25} [\{I_{RE}(n) - I_{RE}(Av)\}] \times \frac{1}{25} \times \sum_{n=1}^{25} [\{I_{PM}(n) - I_{PM}(Av)\}]} \quad (2)$$

In the equation (2), $I_{RE}(Av)$ is a mean value of the third characteristic X-ray intensity obtained along a length of 500 nm. $I_{RE}(n)$ is a mean value of the third characteristic X-ray intensity that is obtained for an n-th interval of 25 intervals arranged in a line and each having a length of 20 nm.

As described above, the particles 31 and 34 are distributed in the catalytic layer 3 with a relatively high uniformity. Therefore, when employing this structure, the same effect as that described with reference to FIGS. 1 to 3 can be obtained. Further, in this catalytic layer 3, a large proportion of the particles 34 are the ones that are positioned near the particles 33. Thus, hydrogen produced by the steam-reforming and water-gas shift reactions can be more effectively utilized for purifying $NO_X$.

Therefore, the exhaust gas-purifying catalyst 1 can offer excellent HC- and $NO_X$-purifying performances for a long period of time.

In the exhaust gas-purifying catalysts 1 described with reference to FIGS. 1 to 4, the catalytic layer 3 has a single layer structure. Instead, the catalytic layer 3 may have a multilayer structure. In this case, the above-described effects can be obtained when one or more layers included in the catalytic layer 3 has the structure described with reference to FIGS. 1 to 4.

Although the exhaust gas-purifying catalyst 1 described with reference to FIGS. 1 to 4 is a monolith catalyst, the above-described technique can be applied to a pellet catalyst.

Examples of the present invention will be described below.

<Manufacture of Catalyst C1>

An exhaust gas-purifying catalyst was manufactured by the following method.

1,300 mL of deionized water was added with 300 g of zirconium oxynitrate solution containing zirconium at a zirconium oxide ($ZrO_2$)-converted concentration of 10% by mass, 300 g of cerium nitrate solution containing cerium at a cerium oxide ($CeO_2$)-converted concentration of 20% by mass, and 40 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 50 g of lanthanum nitrate solution containing lanthanum at a lanthanum oxide ($La_2O_3$)-converted concentration of 10% by mass and 20 g of palladium nitrate solution containing palladium at a concentration of 5% by mass while sufficiently stirring the mixed solution. Then, an aqueous solution containing potassium hydroxide at a concentration of 20% by mass was added to the mixed solution at room temperature until the pH value reached 12 so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C1".

<Manufacture of Catalyst C2>

A pellet catalyst was manufactured by the same method as that described for the catalyst C1 except that the amount of the zirconium oxynitrate solution was changed from 300 g to 340 g and the amount of the lanthanum nitrate solution was changed from 50 g to 10 g. Hereinafter, the pellet catalyst is referred to as "catalyst C2".

<Manufacture of Catalyst C3>

A pellet catalyst was manufactured by the same method as that described for the catalyst C1 except that the amount of the zirconium oxynitrate solution was changed from 300 g to 349 g and the amount of the lanthanum nitrate solution was changed from 50 g to 1 g. Hereinafter, the pellet catalyst is referred to as "catalyst C3".

<Manufacture of Catalyst C4>

A pellet catalyst was manufactured by the same method as that described for the catalyst C1 except that the amount of the zirconium oxynitrate solution was changed from 300 g to 250 g and the amount of the lanthanum nitrate solution was changed from 50 g to 100 g. Hereinafter, the pellet catalyst is referred to as "catalyst C4".

<Manufacture of Catalyst C5>

A pellet catalyst was manufactured by the same method as that described for the catalyst C1 except that the amount of the zirconium oxynitrate solution was changed from 300 g to 230 g and the amount of the lanthanum nitrate solution was changed from 50 g to 120 g. Hereinafter, the pellet catalyst is referred to as "catalyst C5".

<Manufacture of Catalyst C6>

A pellet catalyst was manufactured by the same method as that described for the catalyst C1 except that the amount of the zirconium oxynitrate solution was changed from 300 g to 350 g and the lanthanum nitrate solution was not used. Hereinafter, the pellet catalyst is referred to as "catalyst C6".

<Manufacture of Catalyst C7>

An exhaust gas-purifying catalyst was manufactured by the following method.

1,300 mL of deionized water was added with 300 g of zirconium oxynitrate solution containing zirconium at a zirconium oxide ($ZrO_2$)-converted concentration of 10% by mass, 300 g of cerium nitrate solution containing cerium at a cerium oxide ($CeO_2$)-converted concentration of 20% by mass, and 40 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 50 g of lanthanum nitrate solution containing lanthanum at a lanthanum oxide ($La_2O_3$)-converted concentration of 10% by mass while sufficiently stirring the mixed solution. Then, an aqueous solution containing potassium hydroxide at a concentration of 20% by mass was added to the mixed solution at room temperature until the pH value reached 12 so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 400 mL of deionized water, and 20 g of palladium nitrate solution containing palladium at a concentration of 5% by mass was added to the dispersion so as to allow the powder in the dispersion to adsorb palladium. The dispersion was vacuum-filtered, and the filtrate was subjected to inductively coupled plasma (ICP) spectrometry. As a result, it was revealed that the filter cake contained almost the entire palladium in the dispersion.

Subsequently, the filter cake was dried at 110° C. for 12 hours. Then, it was fired at 500° C. for 1 hour in the atmosphere to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C7".

<Manufacture of Catalyst C8>

An exhaust gas-purifying catalyst was manufactured by the following method.

1,300 mL of deionized water was added with 300 g of zirconium oxynitrate solution containing zirconium at a zirconium oxide ($ZrO_2$)-converted concentration of 10% by mass, 300 g of cerium nitrate solution containing cerium at a cerium oxide ($CeO_2$)-converted concentration of 20% by mass, and 40 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 20 g of palladium nitrate solution containing palladium at a concentration of 5% by mass while sufficiently stirring the mixed solution. Then, an aqueous solution containing potassium hydroxide at a concentration of 20% by mass was added to the mixed solution at room temperature until the pH value reached 12 so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 100 mL of deionized water, and 50 g of lanthanum nitrate solution containing lanthanum at a lanthanum oxide ($La_2O_3$)-converted concentration of 10% by mass was added to the dispersion. Subsequently, an aqueous solution containing potassium hydroxide at a concentration of 20% by mass was added to the mixed solution at room temperature until the pH value reached 12 while sufficiently stirring the mixed solution so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C8".

<Manufacture of Catalyst C9>

An exhaust gas-purifying catalyst was manufactured by the following method.

1,300 mL of deionized water was added with 300 g of zirconium oxynitrate solution containing zirconium at a zirconium oxide ($ZrO_2$)-converted concentration of 10% by mass, 300 g of cerium nitrate solution containing cerium at a cerium oxide ($CeO_2$)-converted concentration of 20% by mass, and 40 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 400 mL of deionized water, and 50 g of lanthanum nitrate solution containing lanthanum at a lanthanum oxide ($La_2O_3$)-converted concentration of 10% by mass and 20 g of palladium nitrate solution containing palladium at a concentration of 5% by mass was added to the dispersion. Then, an aqueous solution containing potassium hydroxide at a concentration of 20% by mass was added to the mixed solution at room temperature while sufficiently stirring the mixed solution until the pH value reached 12 so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C9".

<Manufacture of Catalyst C10>

An exhaust gas-purifying catalyst was manufactured by the following method.

1,300 mL of deionized water was added with 300 g of zirconium oxynitrate solution containing zirconium at a zirconium oxide ($ZrO_2$)-converted concentration of 10% by mass, 300 g of cerium nitrate solution containing cerium at a cerium oxide ($CeO_2$)-converted concentration of 20% by mass, and 40 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the mixed solution was added with 50 g of lanthanum nitrate solution containing lanthanum at a lanthanum oxide ($La_2O_3$)-converted concentration of 10% by mass. Then, an aqueous solution containing potassium hydroxide at a concentration of 20% by mass was added to the mixed solution at room temperature while sufficiently stirring the mixed solution until the pH value reached 12 so as to cause coprecipitation.

Subsequently, 20 g of palladium nitrate solution containing palladium at a concentration of 5% by mass was added to the mixed solution containing the coprecipitate. Then, an aqueous solution containing potassium hydroxide at a concentration of 20% by mass was added to the mixed solution at room temperature while sufficiently stirring the mixed solution until the pH value reached 12 so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C10".

<Manufacture of Catalyst C11>

An exhaust gas-purifying catalyst was manufactured by the following method.

1,300 mL of deionized water was added with 300 g of zirconium oxynitrate solution containing zirconium at a zirconium oxide ($ZrO_2$)-converted concentration of 10% by mass, 300 g of cerium nitrate solution containing cerium at a cerium oxide ($CeO_2$)-converted concentration of 20% by mass, 40 g of yttrium nitrate solution containing yttrium at an yttrium oxide ($Y_2O_3$)-converted concentration of 10% by mass, 50 g of lanthanum nitrate solution containing lanthanum at a lanthanum oxide ($La_2O_3$)-converted concentration of 10% by mass, and 20 g of palladium nitrate solution containing palladium at a concentration of 5% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C11".

<Manufacture of Catalyst C12>

A pellet catalyst was manufactured by the same method as that described for the catalyst C1 except that the amount of the zirconium oxynitrate solution was changed from 300 g to 490 g, the amount of the cerium nitrate solution was changed from 300 g to 225 g, and the yttrium nitrate solution was not used. Hereinafter, the pellet catalyst is referred to as "catalyst C12".

<Manufacture of Catalyst C13>

A pellet catalyst was manufactured by the same method as that described for the catalyst C12 except that a mixed solution of 19.8 g of palladium nitrate solution containing palladium at a concentration of 5% by mass and 0.20 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C13".

<Manufacture of Catalyst C14>

A pellet catalyst was manufactured by the same method as that described for the catalyst C12 except that a mixed solution of 19.8 g of palladium nitrate solution containing palladium at a concentration of 5% by mass and 0.25 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C14".

<Manufacture of Catalyst C15>

A pellet catalyst was manufactured by the same method as that described for the catalyst C12 except that a mixed solution of 19.5 g of palladium nitrate solution containing palladium at a concentration of 5% by mass and 0.49 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C15".

<Manufacture of Catalyst C16>

A pellet catalyst was manufactured by the same method as that described for the catalyst C12 except that a mixed solution of 19.0 g of palladium nitrate solution containing palladium at a concentration of 5% by mass and 0.95 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C16".

<Manufacture of Catalyst C17>

A pellet catalyst was manufactured by the same method as that described for the catalyst C12 except that a mixed solution of 18.2 g of palladium nitrate solution containing palladium at a concentration of 5% by mass and 1.8 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C17".

<Manufacture of Catalyst C18>

A pellet catalyst was manufactured by the same method as that described for the catalyst C12 except that a mixed solution of 13.3 g of palladium nitrate solution containing palladium at a concentration of 5% by mass and 6.7 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C18".

<Manufacture of Catalyst C19>

A pellet catalyst was manufactured by the same method as that described for the catalyst C12 except that a mixed solution of 10 g of palladium nitrate solution containing palladium at a concentration of 5% by mass and 10 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C19".

<Manufacture of Catalyst C20>

A pellet catalyst was manufactured by the same method as that described for the catalyst C12 except that 20 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C20".

<Manufacture of Catalyst C21>

A pellet catalyst was manufactured by the same method as that described for the catalyst C12 except that 20 g of rhodium nitrate solution containing rhodium at a concentration of 5% by mass was used instead of 20 g of palladium nitrate solution containing palladium at a concentration of 5% by mass. Hereinafter, the pellet catalyst is referred to as "catalyst C21".

<Manufacture of Catalyst C22>

A pellet catalyst was manufactured by the same method as that described for the catalyst C10 except that the amount of the zirconium oxynitrate solution was changed from 300 g to 490 g, the amount of the cerium nitrate solution was changed from 300 g to 225 g, and the yttrium nitrate solution was not used. Hereinafter, the pellet catalyst is referred to as "catalyst C22".

<Manufacture of Catalyst C23>

A pellet catalyst was manufactured by the same method as that described for the catalyst C10 except that a mixed solution of 19.5 g of palladium nitrate solution containing palladium at a concentration of 5% by mass and 0.49 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C23".

<Manufacture of Catalyst C24>

A pellet catalyst was manufactured by the same method as that described for the catalyst C10 except that 20 g of dinitrodiamine platinum nitrate solution containing platinum at a concentration of 5% by mass was used instead of 20 g of palladium nitrate solution containing palladium at a concentration of 5% by mass. Hereinafter, the pellet catalyst is referred to as "catalyst C24".

<Manufacture of Catalyst C25>

A pellet catalyst was manufactured by the same method as that described for the catalyst C10 except that 20 g of rhodium nitrate solution containing rhodium at a concentration of 5% by mass was used instead of 20 g of palladium nitrate solution containing palladium at a concentration of 5% by mass. Hereinafter, the pellet catalyst is referred to as "catalyst C25".

<Manufacture of Catalyst C26>

An exhaust gas-purifying catalyst was manufactured by the following method.

1,300 mL of deionized water was added with 699 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 2 g of alcohol solution containing n-propyl alcohol and titanium isopropoxide at a titanium oxide ($TiO_2$)-converted concentration of 5% by mass and 10 g of palladium nitrate solution containing palladium at a concentration of 5% by mass were simultaneously added to the mixed solution while sufficiently stirring the mixed solution so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C26".

<Manufacture of Catalyst C27>

A pellet catalyst was manufactured by the same method as that described for the catalyst C26 except that the amount of the zirconium oxynitrate solution was changed from 699 g to 695 g and the amount of the alcohol solution was changed from 2 g to 10 g. Hereinafter, the pellet catalyst is referred to as "catalyst C27".

<Manufacture of Catalyst C28>

A pellet catalyst was manufactured by the same method as that described for the catalyst C26 except that the amount of the zirconium oxynitrate solution was changed from 699 g to 690 g and the amount of the alcohol solution was changed from 2 g to 20 g. Hereinafter, the pellet catalyst is referred to as "catalyst C28".

<Manufacture of Catalyst C29>

A pellet catalyst was manufactured by the same method as that described for the catalyst C26 except that the amount of the zirconium oxynitrate solution was changed from 699 g to 670 g and the amount of the alcohol solution was changed from 2 g to 60 g. Hereinafter, the pellet catalyst is referred to as "catalyst C29".

<Manufacture of Catalyst C30>

A pellet catalyst was manufactured by the same method as that described for the catalyst C26 except that the amount of the zirconium oxynitrate solution was changed from 699 g to 650 g and the amount of the alcohol solution was changed from 2 g to 100 g. Hereinafter, the pellet catalyst is referred to as "catalyst C30".

<Manufacture of Catalyst C31>

A pellet catalyst was manufactured by the same method as that described for the catalyst C26 except that the amount of the zirconium oxynitrate solution was changed from 699 g to 700 g and the alcohol solution was not used. Hereinafter, the pellet catalyst is referred to as "catalyst C31".

<Manufacture of Catalyst C32>

An exhaust gas-purifying catalyst was manufactured by the following method.

1,300 mL of deionized water was added with 690 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 20 g of alcohol solution containing n-propyl alcohol and titanium isopropoxide at a titanium oxide ($TiO_2$)-converted concentration of 5% by mass was added to the mixed solution while sufficiently stirring the mixed solution so as to cause coprecipitation.

Subsequently, 10 g of palladium nitrate solution containing palladium at a concentration of 5% by mass was added to the mixed solution while sufficiently stirring the mixed solution so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C32".

<Manufacture of Catalyst C33>

An exhaust gas-purifying catalyst was manufactured by the following method.

1,300 mL of deionized water was added with 690 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 10 g of palladium nitrate solution containing palladium at a concentration of 5% by mass was added to the mixed solution while sufficiently stirring the mixed solution so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 500 mL of deionized water, and 20 g of alcohol solution containing n-propyl alcohol and titanium isopropoxide at a titanium oxide ($TiO_2$)-converted concentration of 5% by mass was added to the dispersion while sufficiently stirring the dispersion so as to cause coprecipitation in the dispersion.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C33".

<Manufacture of Catalyst C34>

An exhaust gas-purifying catalyst was manufactured by the following method.

1,300 mL of deionized water was added with 690 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of by mass at room temperature until the pH value reached 12 while sufficiently stirring the mixed solution so as to cause coprecipitation.

After stirring the mixed solution containing the coprecipitate at 70° C. for 60 minutes, 20 g of alcohol solution containing n-propyl alcohol and titanium isopropoxide at a titanium oxide ($TiO_2$)-converted concentration of 5% by mass was added to the mixed solution while sufficiently stirring the mixed solution so as to cause coprecipitation.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 500 mL of deionized water, and 10 g of palladium nitrate solution containing palladium at a concentration of 5% by mass was added to the dispersion while sufficiently stirring the dispersion so as to cause coprecipitation. The dispersion was vacuum-filtered, and the filtrate was subjected to ICP spectrometry. As a result, it was revealed that the filter cake contained almost the entire palladium in the dispersion.

Subsequently, the filter cake was dried at 110° C. for 12 hours. Then, it was fired at 500° C. for 1 hour in the atmosphere to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C34".

<Manufacture of Catalyst C35>

An exhaust gas-purifying catalyst was manufactured by the following method.

1,300 mL of deionized water was added with 690 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 500 mL of deionized water, and 20 g of alcohol solution containing n-propyl alcohol and titanium isopropoxide at a titanium oxide ($TiO_2$)-converted concentration of 5% by mass and 10 g of palladium nitrate solution containing palladium at a concentration of 5% by mass were simultaneously added to the dispersion while sufficiently stirring the dispersion so as to cause coprecipitation in the dispersion.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C35".

<Manufacture of Catalyst C36>

An exhaust gas-purifying catalyst was manufactured by the following method.

1,300 mL of deionized water was added with 690 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, 95 g of yttrium nitrate solution containing yttrium at an yttrium oxide ($Y_2O_3$)-converted concentration of 10% by mass, and 10 g of palladium nitrate solution containing palladium at a concentration of 5% by mass. 20 g of alcohol solution containing n-propyl alcohol and titanium isopropoxide at a titanium oxide ($TiO_2$)-converted concentration of 5% by mass and an aqueous solution containing potassium hydroxide at a concentration of 20% by mass were simultaneously added to the mixed solution at room temperature while sufficiently stirring the mixed solution so as to cause coprecipitation. The loading of aqueous potassium hydroxide was adjusted such that the pH value of the mixed solution was within a range of 11 to 12 after producing the coprecipitate.

After stirring the mixed solution containing the coprecipitate at 70° C. for 60 minutes, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C36".

<Manufacture of Catalyst C37>

An exhaust gas-purifying catalyst was manufactured by the following method.

1,300 mL of deionized water was added with 660 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 20 g of alcohol solution containing n-propyl alcohol and titanium isopropoxide at a titanium oxide ($TiO_2$))-converted concentration of 5% by mass, 10 g of palladium nitrate solution containing palladium at a concentration of 5% by mass, and 30 g of lanthanum nitrate solution containing lanthanum at a lanthanum oxide ($La_2O_3$)-converted concentration of 10% by mass were simultaneously added to the mixed solution while sufficiently stirring the mixed solution so as to cause coprecipitation in the mixed solution.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C37".

<Manufacture of Catalyst C38>

An exhaust gas-purifying catalyst was manufactured by the following method.

1,300 mL of deionized water was added with 660 g of zirconium oxynitrate solution containing zirconium at a zirconium oxide ($ZrO_2$)-converted concentration of 10% by mass, 100 g of cerium nitrate solution containing cerium at a cerium oxide ($CeO_2$)-converted concentration of 20% by mass, and 95 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 10 g of palladium nitrate solution containing palladium at a concentration of 5% by mass and 30 g of lanthanum nitrate solution containing lanthanum at a lanthanum oxide ($La_2O_3$)-converted concentration of 10% by mass were simultaneously added to the mixed solution while sufficiently stirring the mixed solution so as to cause coprecipitation in the mixed solution.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

Next, the powder was dispersed in 500 mL of deionized water, and 20 g of alcohol solution containing n-propyl alcohol and titanium isopropoxide at a titanium oxide ($TiO_2$)-converted concentration of 5% by mass was added to the dispersion while sufficiently stirring the dispersion so as to cause coprecipitation in the dispersion.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C38".

<Manufacture of Catalyst C39>

An exhaust gas-purifying catalyst was manufactured by the following method.

1,300 mL of deionized water was added with 840 g of zirconium oxynitrate solution containing zirconium at a zirconium oxide ($ZrO_2$)-converted concentration of 10% by mass, 50 g of cerium nitrate solution containing cerium at a cerium oxide ($CeO_2$)-converted concentration of 20% by mass, and 50 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 10 g of alcohol solution containing n-propyl alcohol and tetramethoxy silane at a silicon oxide ($SiO_2$)-converted concentration of 5% by mass and 10 g of palladium nitrate solution containing palladium at a concentration of 5% by mass were simultaneously added to the mixed solution while sufficiently stirring the mixed solution so as to cause coprecipitation in the mixed solution.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C39".

<Manufacture of Catalyst C40>

A pellet catalyst was manufactured by the same method as that described for the catalyst C39 except that the alcohol solution and the palladium nitrate solution were added to the mixed solution in this order instead of simultaneously adding the alcohol solution and the palladium nitrate solution to the mixed solution. Hereinafter, the pellet catalyst is referred to as "catalyst C40".

<Manufacture of Catalyst C41>

An exhaust gas-purifying catalyst was manufactured by the following method.

1,300 mL of deionized water was added with 525 g of zirconium oxynitrate solution containing zirconium at a zirconium oxide ($ZrO_2$)-converted concentration of 10% by mass, 200 g of cerium nitrate solution containing cerium at a cerium oxide ($CeO_2$)-converted concentration of 20% by mass, 30 g of neodymium nitrate solution containing neodymium at a neodymium oxide ($Nd_2O_3$)-converted concentration of 10% by mass, and 30 g of yttrium nitrate solution containing yttrium at an yttrium oxide ($Y_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 20 g of ammonium tungstate solution containing tungsten at a tungsten oxide ($WO_3$)-converted concentration of 5% by mass and 10 g of palladium nitrate solution containing palladium at a concentration of 5% by mass were simultaneously added to the mixed solution while sufficiently stirring the mixed solution so as to cause coprecipitation in the mixed solution.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C41".

<Manufacture of Catalyst C42>

A pellet catalyst was manufactured by the same method as that described for the catalyst C41 except that the ammonium tungstate solution and the palladium nitrate solution were added to the mixed solution in this order instead of simultaneously adding the ammonium tungstate solution and the palladium nitrate solution to the mixed solution. Hereinafter, the pellet catalyst is referred to as "catalyst C42".

<Manufacture of Catalyst C43>

An exhaust gas-purifying catalyst was manufactured by the following method.

1,300 mL of deionized water was added with 640 g of zirconium oxynitrate solution containing zirconium at a zirconium oxide ($ZrO_2$)-converted concentration of 10% by mass, 150 g of cerium nitrate solution containing cerium at a cerium oxide ($CeO_2$)-converted concentration of 20% by mass, and 50 g of neodymium nitrate solution containing neodymium at a neodymium oxide ($Nd_2O_3$)-converted concentration of 10% by mass. The mixed solution was added with an aqueous solution containing potassium hydroxide at a concentration of 20% by mass at room temperature until the pH value reached 12 while sufficiently stirring the mixed solution so as to cause coprecipitation.

After stirring the mixed solution containing the coprecipitate at 70° C. for 60 minutes, 10 g of alcohol solution containing n-propyl alcohol and titanium isopropoxide at a titanium oxide ($TiO_2$)-converted concentration of 5% by mass and 10 g of palladium nitrate solution containing palladium at a concentration of 5% by mass were simultaneously added to the mixed solution while sufficiently stirring the mixed solution so as to cause coprecipitation in the mixed solution.

Then, the coprecipitate thus obtained was separated from the solution by filtration and washed with pure water. After drying the coprecipitate at 110° C., it was fired in the atmosphere at 700° C. for 5 hours to obtain a fired product in a form of powder.

The fired product was then compression-molded, and the molded product was pulverized into pellets having a particle diameter of 0.5 mm to 1.0 mm. As above, a pellet catalyst was obtained as an exhaust gas-purifying catalyst. Hereinafter, the pellet catalyst is referred to as "catalyst C43".

<Manufacture of Catalyst C44>

A pellet catalyst was manufactured by the same method as that described for the catalyst C43 except that a mixed solution of 9.90 g of palladium nitrate solution containing palladium at a concentration of 5% by mass and 0.10 g of dinitrodiamine platinum nitrate solution containing platinum at a concentration of 5% by mass was used instead of the palladium nitrate solution. Hereinafter, the pellet catalyst is referred to as "catalyst C44".

<Manufacture of Catalyst C45>

A pellet catalyst was manufactured by the same method as that described for the catalyst C43 except that a mixed solution of 9.88 g of palladium nitrate solution containing palladium at a concentration of 5% by mass and 0.12 g of dinitrodiamine platinum nitrate solution containing platinum at a concentration of 5% by mass was used instead of the palladium nitrate solution. Hereinafter, the pellet catalyst is referred to as "catalyst C45".

<Manufacture of Catalyst C46>

A pellet catalyst was manufactured by the same method as that described for the catalyst C43 except that a mixed solution of 9.76 g of palladium nitrate solution containing palladium at a concentration of 5% by mass and 0.24 g of dinitrodiamine platinum nitrate solution containing platinum at a concentration of 5% by mass was used instead of the palladium nitrate solution. Hereinafter, the pellet catalyst is referred to as "catalyst C46".

<Manufacture of Catalyst C47>

A pellet catalyst was manufactured by the same method as that described for the catalyst C43 except that a mixed solution of 9.52 g of palladium nitrate solution containing palladium at a concentration of 5% by mass and 0.48 g of dinitrodiamine platinum nitrate solution containing platinum at a concentration of 5% by mass was used instead of the palladium nitrate solution. Hereinafter, the pellet catalyst is referred to as "catalyst C47".

<Manufacture of Catalyst C48>

A pellet catalyst was manufactured by the same method as that described for the catalyst C43 except that a mixed solution of 9.09 g of palladium nitrate solution containing palladium at a concentration of 5% by mass and 0.91 g of dinitrodiamine platinum nitrate solution containing platinum at a concentration of 5% by mass was used instead of the palladium nitrate solution. Hereinafter, the pellet catalyst is referred to as "catalyst C48".

<Manufacture of Catalyst C49>

A pellet catalyst was manufactured by the same method as that described for the catalyst C43 except that a mixed solution of 6.67 g of palladium nitrate solution containing palladium at a concentration of 5% by mass and 3.33 g of dinitrodiamine platinum nitrate solution containing platinum at a concentration of 5% by mass was used instead of the palladium nitrate solution. Hereinafter, the pellet catalyst is referred to as "catalyst C49".

<Manufacture of Catalyst C50>

A pellet catalyst was manufactured by the same method as that described for the catalyst C43 except that a mixed solution of 5.00 g of palladium nitrate solution containing palladium at a concentration of 5% by mass and 5.00 g of dinitrodiamine platinum nitrate solution containing platinum at a concentration of 5% by mass was used instead of the palladium nitrate solution. Hereinafter, the pellet catalyst is referred to as "catalyst C50".

<Manufacture of Catalyst C51>

A pellet catalyst was manufactured by the same method as that described for the catalyst C43 except that 10 g of dinitrodiamine platinum nitrate solution containing platinum at a concentration of 5% by mass was used instead of the palladium nitrate solution. Hereinafter, the pellet catalyst is referred to as "catalyst C51".

<Manufacture of Catalyst C52>

A pellet catalyst was manufactured by the same method as that described for the catalyst C43 except that 10 g of rhodium nitrate solution containing rhodium at a concentration of 5% by mass was used instead of the palladium nitrate solution. Hereinafter, the pellet catalyst is referred to as "catalyst C52".

<Manufacture of Catalyst C53>

A pellet catalyst was manufactured by the same method as that described for the catalyst C43 except that the alcohol solution and the palladium nitrate solution were added to the mixed solution in this order instead of simultaneously adding the alcohol solution and the palladium nitrate solution to the mixed solution. Hereinafter, the pellet catalyst is referred to as "catalyst C53".

<Manufacture of Catalyst C54>

A pellet catalyst was manufactured by the same method as that described for the catalyst C53 except that a mixed solution of 9.76 g of palladium nitrate solution containing palladium at a concentration of 5% by mass and 0.24 g of dinitrodiamine platinum nitrate solution containing platinum at a concentration of 5% by mass was used instead of the palladium nitrate solution. Hereinafter, the pellet catalyst is referred to as "catalyst C54".

<Manufacture of Catalyst C55>

A pellet catalyst was manufactured by the same method as that described for the catalyst C53 except that 10 g of dinitrodiamine platinum nitrate solution containing platinum at a concentration of 5% by mass was used instead of the palladium nitrate solution. Hereinafter, the pellet catalyst is referred to as "catalyst C56".

<Manufacture of Catalyst C57>

A pellet catalyst was manufactured by the same method as that described for the catalyst C53 except that 10 g of rhodium nitrate solution containing rhodium at a concentration of 5% by mass was used instead of the palladium nitrate solution. Hereinafter, the pellet catalyst is referred to as "catalyst C57".

<Manufacture of Catalyst C58>

A pellet catalyst was manufactured by the same method as that described for the catalyst C1 except that 50 g of neodymium nitrate solution containing neodymium at a neodymium oxide ($Nd_2O_3$)-converted concentration of 10% by mass was used instead of the lanthanum nitrate solution. Hereinafter, the pellet catalyst is referred to as "catalyst C58".

<Manufacture of Catalyst C59>

A pellet catalyst was manufactured by the same method as that described for the catalyst C7 except that 50 g of neodymium nitrate solution containing neodymium at a neodymium oxide ($Nd_2O_3$)-converted concentration of 10% by mass was used instead of the lanthanum nitrate solution. Hereinafter, the pellet catalyst is referred to as "catalyst C59".

<Dispersity Evaluation 1>

A line analysis was performed along a length of 500 nm on each of the catalysts C1 to C25, C27 and C28 using energy dispersive X-ray spectrometry, to be more specific, field emission-scanning electron microscope-energy dispersive X-ray analysis (FE-SEM-EDX). For the line analysis, used was ultra-high resolution field-emission scanning electron microscope S-4800 manufactured by Hitachi High-Technologies Corporation.

Then, a correlation coefficient σ(Ce, PM) for the spectra of the characteristic X-ray intensities obtained for cerium and a respective precious metal element was calculated from the following equation (3).

Regarding the catalysts C1 to C25, a correlation coefficient σ(Ce, La) for the spectra of the characteristic X-ray intensities obtained for cerium and lanthanum was calculated from the following equation (4). In addition, a correlation coefficient σ(La, PM) for the spectra of the characteristic X-ray intensities obtained for lanthanum and a respective precious metal element was calculated from the following equation (5).

Regarding the catalysts C57 and C58, a correlation coefficient σ(Ce, La) for the spectra of the characteristic X-ray intensities obtained for cerium and neodymium was calculated from the following equation (6). In addition, a correlation coefficient σ(La, PM) for the spectra of the characteristic X-ray intensities obtained for neodymium and a respective precious metal element was calculated from the following equation (7).

$$\sigma(Ce, PM) = \frac{\frac{1}{25} \times \sum_{n=1}^{25} [\{I_{Ce}(n) - I_{Ce}(Av)\} \times \{I_{PM}(n) - I_{PM}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{PM}(n) - I_{PM}(Av)\}]} \quad (3)$$

$$\sigma(Ce, La) = \frac{\frac{1}{25} \times \sum_{n=1}^{25} [\{I_{Ce}(n) - I_{Ce}(Av)\} \times \{I_{La}(n) - I_{La}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{La}(n) - I_{La}(Av)\}]} \quad (4)$$

-continued $$\sigma(La, PM) = \frac{\frac{1}{25} \times \sum_{n=1}^{25} [\{I_{La}(n) - I_{La}(Av)\} \times \{I_{PM}(n) - I_{PM}(Av)\}]}{\frac{1}{25} \times \sum_{n=1}^{25} [\{I_{La}(n) - I_{La}(Av)\}] \times \frac{1}{25} \times \sum_{n=1}^{25} [\{I_{PM}(n) - I_{PM}(Av)\}]} \quad (5)$$

$$\sigma(Ce, Nd) = \frac{\frac{1}{25} \times \sum_{n=1}^{25} [\{I_{Ce}(n) - I_{Ce}(Av)\} \times \{I_{Nd}(n) - I_{Nd}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{Nd}(n) - I_{Nd}(Av)\}]} \quad (6)$$

$$\sigma(Nd, PM) = \frac{\frac{1}{25} \times \sum_{n=1}^{25} [\{I_{Nd}(n) - I_{Nd}(Av)\} \times \{I_{PM}(n) - I_{PM}(Av)\}]}{\frac{1}{25} \times \sum_{n=1}^{25} [\{I_{Nd}(n) - I_{Nd}(Av)\}] \times \frac{1}{25} \times \sum_{n=1}^{25} [\{I_{PM}(n) - I_{PM}(Av)\}]} \quad (7)$$

In the equations (3), (4) and (6), $I_{CE}(Av)$ is a mean value of the characteristic X-ray intensity obtained for cerium along a length of 500 nm, and $I_{CE}(n)$ is a mean value of the characteristic X-ray intensity for cerium that is obtained for an n-th interval of 25 intervals arranged in a line and each having a length of 20 nm. In the equations (3), (5) and (7), $I_{PM}(Av)$ is a mean value of the characteristic X-ray intensity obtained for palladium, platinum or rhodium along a length of 500 nm, and $I_{PM}(n)$ is a mean value of the characteristic X-ray intensity for palladium, platinum or rhodium that is obtained for an n-th interval of 25 intervals arranged in a line and each having a length of 20 nm. In the equations (4) and (5), $I_{La}(Av)$ is a mean value of the characteristic X-ray intensity obtained for lanthanum along a length of 500 nm, and $I_{La}(n)$ is a mean value of the characteristic X-ray intensity for lanthanum that is obtained for an n-th interval of 25 intervals arranged in a line and each having a length of 20 nm. In the equations (6) and (7), $I_{Nd}(Av)$ is a mean value of the characteristic X-ray intensity obtained for neodymium along a length of 500 nm, and $I_{Nd}(n)$ is a mean value of the characteristic X-ray intensity for neodymium that is obtained for an n-th interval of 25 intervals arranged in a line and each having a length of 20 nm.

The correlation coefficients and composition of each catalyst are summarized in TABLES 1 to 3 and 7 below.

<Endurance Evaluation 1>

Performances of the catalysts C1 to C25, C57 and C58 were checked by the following method.

First, each of the catalysts C1 to C25, C57 and C58 was set in a flow-type endurance test apparatus, and a gas containing nitrogen as a main component was made to flow through the catalyst bed at a flow rate of 500 mL/minute for 20 hours. During this period, the temperature of the catalyst bed was held at 850° C. As the gas made to flow through the catalyst bed, a lean gas and a rich gas were used, and these gases were switched at intervals of 5 minutes. Note that the lean gas was a mixed gas prepared by adding oxygen to nitrogen at a concentration of 1%, while the rich gas was a mixed gas prepared by adding carbon monoxide to nitrogen at a concentration of 2%.

Then, each of the C1 to C25, C57 and C58 was set in an atmospheric fixed bed flow reactor. Subsequently, the temperature of the catalyst bed was raised from 100° C. to 500° C. at the temperature increase rate of 12° C./minute and the exhaust gas-purifying ratio was continuously measured while a model gas was made to flow through the catalyst bed. As the model gas, used was a gas corresponding to a lean atmosphere with an air-to-fuel ratio (A/F) of 15. The results were summarized in TABLES 1 to 3 and 7 below.

Further, for each of the catalysts C1 to C25, C57 and C58 after the above-described endurance test, the average particle diameter of the precious metal particles was calculated from an X-ray diffraction peak. The results were summarized in TABLES 1 to 3 and 7 below.

<Dispersity Evaluation 2>

The same line analysis as that performed in the dispersity evaluation 1 was performed on each of the catalysts C26 to C56.

Then, a correlation coefficient $\sigma(Ce, PM)$ for the spectra of the characteristic X-ray intensities obtained for cerium and a respective precious metal element was calculated from the following equation (8). Also, a correlation coefficient $\sigma(Ce, AO)$ for the spectra of the characteristic X-ray intensities obtained for cerium and titanium, silicon or tungsten was calculated from the following equation (9). Further, a correlation coefficient $\sigma(AO,PM)$ for the spectra of the characteristic X-ray intensities obtained for titanium, silicon or tungsten and a respective precious metal element was calculated from the following equation (10).

Regarding the catalysts C37 and C38, a correlation coefficient $\sigma(La, PM)$ for the spectra of the characteristic X-ray intensities obtained for lanthanum and a respective precious metal element was calculated from the following equation (11).

$$\sigma(Ce, PM) = \frac{\frac{1}{25} \times \sum_{n=1}^{25} [\{I_{Ce}(n) - I_{Ce}(Av)\} \times \{I_{PM}(n) - I_{PM}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{PM}(n) - I_{PM}(Av)\}]} \quad (8)$$

$$\sigma(Ce, AO) = \frac{\frac{1}{25} \times \sum_{n=1}^{25} [\{I_{Ce}(n) - I_{Ce}(Av)\} \times \{I_{AO}(n) - I_{AO}(Av)\}]}{\frac{1}{25} \times \sum_{n=1}^{25} [\{I_{Ce}(n) - I_{Ce}(Av)\}] \times \frac{1}{25} \times \sum_{n=1}^{25} [\{I_{AO}(n) - I_{AO}(Av)\}]} \quad (9)$$

$$\sigma(AO, PM) = \frac{\frac{1}{25} \times \sum_{n=1}^{25} [\{I_{AO}(n) - I_{AO}(Av)\} \times \{I_{PM}(n) - I_{PM}(Av)\}]}{\frac{1}{25} \times \sum_{n=1}^{25} [\{I_{AO}(n) - I_{AO}(Av)\}] \times \frac{1}{25} \times \sum_{n=1}^{25} [\{I_{PM}(n) - I_{PM}(Av)\}]} \quad (10)$$

$$\sigma(La, PM) = \frac{\frac{1}{25} \times \sum_{n=1}^{25} [\{I_{La}(n) - I_{La}(Av)\} \times \{I_{PM}(n) - I_{PM}(Av)\}]}{\frac{1}{25} \times \sum_{n=1}^{25} [\{I_{La}(n) - I_{La}(Av)\}] \times \frac{1}{25} \times \sum_{n=1}^{25} [\{I_{PM}(n) - I_{PM}(Av)\}]} \quad (11)$$

In the equations (8) and (9), $I_{CE}(Av)$ is a mean value of the characteristic X-ray intensity obtained for cerium along a length of 500 nm, and $I_{CE}(n)$ is a mean value of the characteristic X-ray intensity for cerium that is obtained for an n-th interval of 25 intervals arranged in a line and each having a length of 20 nm. In the equations (8), (10) and (11), $I_{PM}(Av)$ is a mean value of the characteristic X-ray intensity obtained for palladium, platinum or rhodium along a length of 500 nm, and $I_{PM}(n)$ is a mean value of the characteristic X-ray intensity for palladium, platinum or rhodium that is obtained for an n-th interval of 25 intervals arranged in a line and each having a length of 20 nm. In the equations (9) and (10), $I_{AO}(Av)$ is a mean value of the characteristic X-ray intensity obtained for titanium, silicon or tungsten along a length of 500 nm, and $I_{AO}(n)$ is a mean value of the characteristic X-ray intensity for titanium, silicon or tungsten that is obtained for an n-th interval of 25 intervals arranged in a line and each having a length of 20 nm. In the equation (11), $I_{La}(Av)$ is a mean value of the characteristic X-ray intensity obtained for lanthanum along a length of 500 nm, and $I_{La}(n)$ is a mean value of the characteristic X-ray intensity for lanthanum that is obtained for an n-th interval of 25 intervals arranged in a line and each having a length of 20 nm.

The correlation coefficients are summarized in TABLES 4 to 7 below.

<Endurance Evaluation 2>

Performances of the catalysts C26 to C56 were checked by the following method.

First, each of the catalysts C26 to C56 was set in a flow-type endurance test apparatus, and a gas containing nitrogen as a main component was made to flow through the catalyst bed at a flow rate of 500 mL/minute for 20 hours. During this period, the temperature of the catalyst bed was held at 900° C. As the gas made to flow through the catalyst bed, a lean gas and a rich gas were used, and these gases were switched at intervals of 5 minutes. Note that the lean gas was a mixed gas prepared by adding sulfur dioxide and oxygen to nitrogen at concentrations of 0.03% and 3%, respectively. Note also that the rich gas was a mixed gas prepared by adding sulfur dioxide and carbon monoxide to nitrogen at concentrations of 0.03% and 6%, respectively.

Then, each of the C26 to C56 was set in an atmospheric fixed bed flow reactor. Subsequently, the temperature of the catalyst bed was raised from 100° C. to 500° C. at the temperature increase rate of 12° C./minute and the exhaust gas-purifying ratio was continuously measured while a model gas was made to flow through the catalyst bed. As the model gas, used was a gas corresponding to a lean atmosphere with an air-to-fuel ratio (A/F) of 15. The results were summarized in TABLES 4 to 7 below.

Further, for each of the catalysts C26 to C56 after the above-described endurance test, the average particle diameter of the precious metal particles was calculated from an X-ray diffraction peak. The results were summarized in TABLES 4 to 7 below.

TABLE 1

| Catalyst | Composition | PM conc. (mass %) | La conc. (mass %) | La/PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, La) | Correlation coefficient σ(La, PM) |
|---|---|---|---|---|---|---|---|---|---|---|
| C1 | Pd/La/CZY | 1 | 5 | 5 | 312 | 294 | 19 | 0.81 | 0.83 | 0.80 |
| C2 | Pd/La/CZY | 1 | 1 | 1 | 314 | 296 | 20 | 0.80 | 0.81 | 0.78 |
| C3 | Pd/La/CZY | 1 | 0.1 | 0.1 | 327 | 303 | 23 | 0.82 | 0.78 | 0.75 |
| C4 | Pd/La/CZY | 1 | 10 | 10 | 327 | 306 | 21 | 0.78 | 0.79 | 0.74 |
| C5 | Pd/La/CZY | 1 | 12 | 12 | 340 | 324 | 23 | 0.74 | 0.75 | 0.68 |
| C6 | Pd/CZY | 1 | 0 | 0 | 371 | 336 | 24 | 0.81 | — | — |
| C7 | Pd/La/CZY | 1 | 5 | 5 | 353 | 330 | 30 | 0.45 | 0.83 | 0.34 |
| C8 | Pd/La/CZY | 1 | 5 | 5 | 345 | 325 | 23 | 0.80 | 0.41 | 0.31 |
| C9 | Pd/La/CZY | 1 | 5 | 5 | 351 | 328 | 31 | 0.43 | 0.37 | 0.29 |
| C10 | Pd/La/CZY | 1 | 5 | 5 | 336 | 321 | 23 | 0.79 | 0.80 | 0.64 |
| C11 | Pd/La/CZY | 1 | 5 | 5 | 340 | 323 | 24 | 0.81 | 0.79 | 0.60 |

TABLE 2

| Catalyst | Composition | PM conc. (mass %) | La conc. (mass %) | La/PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, La) | Correlation coefficient σ(La, PM) |
|---|---|---|---|---|---|---|---|---|---|---|
| C12 | Pd/La/ZC | 1 | 5 | 5 | 388 | 351 | 27 | 0.78 | 0.81 | 0.76 |
| C13 | Pd/Pt/La/ZC (Pd:Pt = 100:1) | 1 | 5 | 5 | 392 | 357 | 29 | 0.77 (Pd) 0.79 (Pt) | 0.80 | 0.76 (Pd) 0.77 (Pt) |
| C14 | Pd/Pt/La/ZC (Pd:Pt = 80:1) | 1 | 5 | 5 | 381 | 345 | 25 | 0.78 (Pd) 0.78 (Pt) | 0.81 | 0.76 (Pd) 0.75 (Pt) |
| C15 | Pd/Pt/La/ZC (Pd:Pt = 40:1) | 1 | 5 | 5 | 370 | 335 | 23 | 0.79 (Pd) 0.78 (Pt) | 0.80 | 0.76 (Pd) 0.77 (Pt) |
| C16 | Pd/Pt/La/ZC (Pd:Pt = 20:1) | 1 | 5 | 5 | 369 | 336 | 22 | 0.78 (Pd) 0.79 (Pt) | 0.81 | 0.75 (Pd) 0.76 (Pt) |
| C17 | Pd/Pt/La/ZC (Pd:Pt = 10:1) | 1 | 5 | 5 | 367 | 336 | 22 | 0.78 (Pd) 0.77 (Pt) | 0.81 | 0.76 (Pd) 0.76 (Pt) |
| C18 | Pd/Pt/La/ZC (Pd:Pt = 2:1) | 1 | 5 | 5 | 383 | 348 | 18 | 0.79 (Pd) 0.77 (Pt) | 0.80 | 0.75 (Pd) 0.76 (Pt) |
| C19 | Pd/Pt/La/ZC (Pd:Pt = 1:1) | 1 | 5 | 5 | 390 | 364 | 14 | 0.78 (Pd) 0.78 (Pt) | 0.79 | 0.76 (Pd) 0.75 (Pt) |
| C20 | Pt/La/ZC | 1 | 5 | 5 | 399 | 390 | 7 | 0.78 | 0.80 | 0.77 |
| C21 | Rh/La/ZC | 1 | 5 | 5 | 410 | 393 | ND | 0.79 | 0.81 | 0.77 |

TABLE 3

| Catalyst | Composition | PM conc. (mass %) | La conc. (mass %) | La/PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, La) | Correlation coefficient σ(La, PM) |
|---|---|---|---|---|---|---|---|---|---|---|
| C22 | Pd/La/ZC | 1 | 5 | 5 | 417 | 370 | 30 | 0.78 | 0.79 | 0.65 |
| C23 | Pd/Pt/La/ZC (Pd:Pt = 40:1) | 1 | 5 | 5 | 399 | 352 | 27 | 0.79 (Pd) 0.79 (Pt) | 0.80 | 0.65 (Pd) 0.65 (Pt) |
| C24 | Pt/La/ZC | 1 | 5 | 5 | 415 | 407 | 8 | 0.79 | 0.81 | 0.64 |
| C25 | Rh/La/ZC | 1 | 5 | 5 | 427 | 400 | ND | 0.79 | 0.79 | 0.64 |

TABLE 4

| Catalyst | Composition | PM conc. (mass %) | AO conc. (mass %) | La conc. (mass %) | AO/PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, AO) | Correlation coefficient σ(AO, PM) |
|---|---|---|---|---|---|---|---|---|---|---|---|
| C26 | Pd/Ti/CZY | 0.5 | 0.1 | 0 | 0.2 | 367 | 356 | 30 | 0.82 | 0.79 | 0.76 |
| C27 | Pd/Ti/CZY | 0.5 | 0.5 | 0 | 1 | 363 | 351 | 29 | 0.83 | 0.81 | 0.79 |
| C28 | Pd/Ti/CZY | 0.5 | 1 | 0 | 2 | 365 | 350 | 29 | 0.82 | 0.82 | 0.80 |
| C29 | Pd/Ti/CZY | 0.5 | 3 | 0 | 6 | 367 | 355 | 30 | 0.81 | 0.80 | 0.78 |
| C30 | Pd/Ti/CZY | 0.5 | 5 | 0 | 10 | 380 | 372 | 31 | 0.78 | 0.76 | 0.70 |
| C31 | Pd/Ti/CZY | 0.5 | 0 | 0 | 0 | 395 | 381 | 30 | 0.82 | — | — |
| C32 | Pd/Ti/CZY | 0.5 | 1 | 0 | 2 | 384 | 370 | 33 | 0.78 | 0.77 | 0.64 |
| C33 | Pd/Ti/CZY | 0.5 | 1 | 0 | 2 | 390 | 376 | 34 | 0.80 | 0.45 | 0.34 |
| C34 | Pd/Ti/CZY | 0.5 | 1 | 0 | 2 | 391 | 377 | 43 | 0.42 | 0.80 | 0.31 |
| C35 | Pd/Ti/CZY | 0.5 | 1 | 0 | 2 | 395 | 379 | 45 | 0.44 | 0.39 | 0.27 |
| C36 | Pd/Ti/CZY | 0.5 | 1 | 0 | 2 | 390 | 373 | 33 | 0.78 | 0.76 | 0.64 |

TABLE 5

| Catalyst | Composition | PM conc. (mass %) | AO conc. (mass %) | La conc. (mass %) | AO/PM | 50% purifying temperature (° C.) HC | 50% purifying temperature (° C.) NO$_x$ | Average particle diameter of precious metal (nm) | Correlation coefficient σ(Ce, PM) | Correlation coefficient σ(La, PM) | Correlation coefficient σ(Ce, AO) | Correlation coefficient σ(AO, PM) |
|---|---|---|---|---|---|---|---|---|---|---|---|---|
| C37 | Pd/Ti/La/CZY | 0.5 | 1 | 3 | 2 | 335 | 323 | 27 | 0.82 | 0.80 | 0.80 | 0.77 |
| C38 | Pd/Ti/La/CZY | 0.5 | 1 | 3 | 2 | 358 | 346 | 29 | 0.79 | 0.79 | 0.44 | 0.36 |
| C39 | Pd/Si/CZY | 0.5 | 0.5 | 0 | 1 | 372 | 360 | 31 | 0.80 | — | 0.81 | 0.78 |
| C40 | Pd/Si/CZY | 0.5 | 0.5 | 0 | 1 | 407 | 397 | 35 | 0.77 | — | 0.76 | 0.67 |
| C41 | Pd/W/CZNY | 0.5 | 1 | 0 | 2 | 368 | 355 | 32 | 0.81 | — | 0.79 | 0.76 |
| C42 | Pd/W/CZNY | 0.5 | 1 | 0 | 2 | 395 | 382 | 35 | 0.78 | — | 0.76 | 0.66 |

TABLE 6

| Catalyst | Composition | PM conc. (mass %) | AO conc. (mass %) | La conc. (mass %) | AO/PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, AO) | Correlation coefficient σ(AO, PM) |
|---|---|---|---|---|---|---|---|---|---|---|---|
| C43 | Pd/Ti/CZN | 0.5 | 0.5 | 0 | 1 | 358 | 347 | 31 | 0.61 | 0.81 | 0.79 |
| C44 | Pd/Pt/Ti/CZN (Pd:Pt = 100:1) | 0.5 | 0.5 | 0 | 1 | 362 | 350 | 32 | 0.79 (Pd) 0.80 (Pt) | 0.79 | 0.79 (Pd) 0.78 (Pt) |
| C45 | Pd/Pt/Ti/CZN (Pd:Pt = 80:1) | 0.5 | 0.5 | 0 | 1 | 350 | 341 | 29 | 0.79 (Pd) 0.78 (Pt) | 0.81 | 0.76 (Pd) 0.77 (Pt) |
| C46 | Pd/Pt/Ti/CZN (Pd:Pt = 40:1) | 0.5 | 0.5 | 0 | 1 | 339 | 330 | 26 | 0.79 (Pd) 0.80 (Pt) | 0.80 | 0.78 (Pd) 0.79 (Pt) |
| C47 | Pd/Pt/Ti/CZN (Pd:Pt = 20:1) | 0.5 | 0.5 | 0 | 1 | 341 | 331 | 26 | 0.78 (Pd) 0.78 (Pt) | 0.79 | 0.75 (Pd) 0.75 (Pt) |
| C48 | Pd/Pt/Ti/CZN (Pd:Pt = 10:1) | 0.5 | 0.5 | 0 | 1 | 340 | 330 | 25 | 0.79 (Pd) 0.78 (Pt) | 0.80 | 0.77 (Pd) 0.76 (Pt) |

TABLE 6-continued

| Catalyst | Composition | PM conc. (mass %) | AO conc. (mass %) | La conc. (mass %) | AO/ PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, AO) | Correlation coefficient σ(AO, PM) |
|---|---|---|---|---|---|---|---|---|---|---|---|
| C49 | Pd/Pt/Ti/CZN (Pd:Pt = 2:1) | 0.5 | 0.5 | 0 | 1 | 349 | 342 | 22 | 0.78 (Pd) 0.78 (Pt) | 0.79 | 0.75 (Pd) 0.75 (Pt) |
| C50 | Pd/Pt/Ti/CZN (Pd:Pt = 1:1) | 0.5 | 0.5 | 0 | 1 | 357 | 355 | 17 | 0.78 (Pd) 0.77 (Pt) | 0.79 | 0.76 (Pd) 0.74 (Pt) |
| C51 | Pt/Ti/CZN | 0.5 | 0.5 | 0 | 1 | 369 | 377 | 13 | 0.79 | 0.79 | 0.77 |
| C52 | Rh/Ti/CZN | 0.5 | 0.5 | 0 | 1 | 377 | 372 | ND | 0.78 | 0.80 | 0.77 |

TABLE 7

| Catalyst | Composition | PM conc. (mass %) | AO conc. (mass %) | La conc. (mass %) | AO/ PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, AO) | Correlation coefficient σ(AO, PM) |
|---|---|---|---|---|---|---|---|---|---|---|---|
| C53 | Pd/Ti/CZN | 0.5 | 0.5 | 0 | 1 | 375 | 361 | 35 | 0.77 | 0.75 | 0.66 |
| C54 | Pd/Pt/Ti/CZN (Pd:Pt = 40:1) | 0.5 | 0.5 | 0 | 1 | 357 | 348 | 31 | 0.76 (Pd) 0.76 (Pt) | 0.76 | 0.65 (Pd) 0.66 (Pt) |
| C55 | Pt/Ti/CZN | 0.5 | 0.5 | 0 | 1 | 388 | 394 | 15 | 0.76 | 0.75 | 0.65 |
| C56 | Rh/Ti/CZN | 0.5 | 0.5 | 0 | 1 | 396 | 389 | ND | 0.76 | 0.76 | 0.66 |

| Catalyst | Composition | PM conc. (mass %) | AO conc. (mass %) | Nd conc. (mass %) | Nd/ PM | 50% purifying temperature (° C.) HC | 50% purifying temperature (° C.) NO$_x$ | Average particle diameter of precious metal (nm) | Correlation coefficient σ(Ce, PM) | Correlation coefficient σ(Ce, Nd) | Correlation coefficient σ(Nd, PM) |
|---|---|---|---|---|---|---|---|---|---|---|---|
| C57 | Pd/Nd/CZY | 1 | 0 | 5 | 5 | 316 | 299 | 20 | 0.80 | 0.82 | 0.80 |
| C58 | Pd/Nd/CZY | 1 | 0 | 5 | 5 | 358 | 336 | 30 | 0.44 | 0.83 | 0.35 |

In the columns of TABLES 1 to 7 labeled with "Composition", "CZY" represents a composite oxide containing cerium, zirconium and yttrium, "CZN" represents a composite oxide containing cerium, zirconium and neodymium, and "CZNY" represents a composite oxide containing cerium, zirconium, neodymium and yttrium. "PM conc." represents a concentration of a precious metal, "AO conc." represents a concentration of an acidic oxide, "La/PM" represents a mass ratio of lanthanum to a precious metal, "Nd/PM" represents a mass ratio of neodymium to a precious metal, and "AO/PM" represents a mass ratio of an acidic oxide to a precious metal. Each value in the columns labeled with "50% purifying temperature" represents the lowest temperature of the catalyst bed at which 50% or more of the respective component of the model gas was purified. Specifically, the columns labeled with "HC" and "NO$_x$" show the data obtained for hydrocarbons and the data obtained for nitrogen oxides, respectively. "ND" in the columns labeled with "Average particle diameter of precious metal" indicates that no diffraction peak was detected.

As shown in TABLE 1, although the catalyst C1 has the same composition as those of the catalysts C6 to C11, the catalyst C1 has correlation coefficients σ(Ce, PM) and σ(Ce, La) that are equal to or greater than those of the catalysts C6 to C11 and has a correlation coefficient σ(La, PM) that is greater than those of the catalysts C6 to C11. The catalyst C1 is excellent in the HC- and NO$_x$-purifying performances after a long-term use as compared with the catalyst C6 to C11. This reveals that the correlation coefficients σ(Ce, PM), σ(Ce, La) and σ(La, PM), in particular, the correlation coefficient σ(La, PM) have a effect on the endurance of the catalyst.

As shown in TABLE 1, the catalyst C1 has the same composition as those of the catalysts C6 to C11. However, the catalyst C1 has correlation coefficients σ(Ce, PM) and σ(Ce, La) that are equal to or greater than those of the catalysts C6 to C11 and has a correlation coefficient σ(La, PM) that is greater than those of the catalysts C6 to C11. In general, the greater the correlation coefficient σ(RE, PM), the greater the dispersity of each of the rare-earth element other than cerium and the precious metal, and thus the particles made of the rare-earth element or compounds thereof and the particles made of the precious metal element form a more homogeneous mixture.

Further, the result of measurement using FE-SEM-EDX reveals that in the catalyst C1, lanthanum and the precious metal element are positioned among the particles made of the composite oxide containing cerium, zirconium and yttrium.

Further, the catalyst C1 is excellent in the HC- and NO$_x$-purifying performance than the catalysts C6 to C11, and the average particle diameter of the precious metal after a long-term use is smaller in the former than in the latter.

As will be apparent from the above, the HC- and NO$_x$-purifying performance after a long-term use can be improved by arranging the particles made of rare-earth element(s) other than cerium and/or compound(s) thereof and the particles made of precious metal element(s) among the particles made of an oxygen storage material and increasing the correlation coefficient σ(RE, PM).

As shown in TABLE 4, the catalyst C28 has the same composition as those of the catalysts C32 to C36. However, the catalyst C28 has correlation coefficients σ(Ce, PM) and σ(Ce, AO) that are equal to or greater than those of the catalysts C32 to C36 and has a correlation coefficient σ(AO, PM) that is greater than those of the catalysts C32 to C36. In general, the greater the correlation coefficient σ(AO,PM), the greater the dispersity of each of the acidic oxide and the precious metal, and thus the particles made of the acidic oxide and the particles made of the precious metal element form a more homogeneous mixture.

Further, the result of measurement using FE-SEM-EDX reveals that in the catalyst C28, the elements of the acidic oxide other than oxygen and the precious metal element are positioned among the particles made of the composite oxide containing cerium, zirconium and yttrium.

Further, the catalyst C28 is excellent in the HC- and $NO_X$- purifying performance than the catalysts C32 to C36, and the average particle diameter of the precious metal after a long-term use is smaller in the former than in the latter.

As will be apparent from the above, the HC- and $NO_X$-purifying performance after a long-term use can be improved by arranging the particles made of acidic oxide(s) and the particles made of precious metal element(s) among the particles made of an oxygen storage material and increasing the correlation coefficient σ(AO,PM).

As described above, the HC- and $NO_X$-purifying performance after a long-term use can be improved by arranging the particles made of rare-earth element(s) other than cerium and/or compound(s) thereof and the particles made of precious metal element(s) among the particles made of an oxygen storage material and increasing the correlation coefficient σ(RE, PM). Similarly, the HC- and $NO_X$-purifying performance after a long-term use can be improved by arranging the particles made of acidic oxide(s) and the particles made of precious metal element(s) among the particles made of an oxygen storage material and increasing the correlation coefficient σ(AO,PM). Therefore, the HC- and $NO_X$-purifying performance after a long-term use can be further improved by arranging the particles made of acidic oxide(s), the particles made of rare-earth element(s) other than cerium and/or compound(s) thereof and the particles made of precious metal element(s) among the particles made of an oxygen storage material and increasing the correlation coefficients σ(RE, PM) and σ(AO,PM).

FIG. 5 is a graph showing an example of influence that a mass ratio of palladium to platinum exerts on the $NO_X$-purifying performance after an endurance test. FIG. 6 is a graph showing an example of influence that a mass ratio of a rare-earth element other than cerium to a precious metal exerts on the $NO_X$-purifying performance after an endurance test.

The graphs shown in FIGS. 5 and 6 were plotted using a part of data shown in TABLES 1 to 3. In the graph of FIG. 5, the abscissa represents a mass ratio of palladium to platinum, while the ordinate represents 50% purifying temperature for $NO_X$. In the graph of FIG. 6, the abscissa represents a mass ratio of lanthanum to precious metal, while the ordinate represents 50% purifying temperature for $NO_X$.

Regarding the catalysts C13 to C19 each containing lanthanum, 50% purifying temperature of 348° C. or less could be achieved in the case where the mass ratio of palladium to platinum was within a range of 2 to 80 as shown in FIG. 5. Further, in the case where the mass ratio was within a range of 10 to 40, 50% purifying temperature of 335° C. to 336° C. could be achieved.

Regarding the catalysts C1 to C6, 50% purifying temperature of 324° C. or less could be achieved in the case where the mass ratio of lanthanum to precious metal was within a range of 0.1 to 12 as shown in FIG. 6. Further, in the case where the mass ratio was within a range of 0.1 to 10, 50% purifying temperature of 306° C. or less could be achieved.

FIG. 7 is a graph showing another example of influence that a mass ratio of palladium to platinum exerts on the $NO_X$-purifying performance after an endurance test. FIG. 8 is a graph showing an example of influence that a mass ratio of an acidic oxide to a precious metal exerts on the $NO_X$-purifying performance after an endurance test.

The graphs shown in FIGS. 7 and 8 were plotted using a part of data shown in TABLES 4 to 7. In the graph of FIG. 7, the abscissa represents a mass ratio of palladium to platinum, while the ordinate represents 50% purifying temperature for $NO_X$. In the graph of FIG. 8, the abscissa represents a mass ratio of acidic oxide to precious metal, while the ordinate represents 50% purifying temperature for $NO_X$.

Regarding the catalysts C44 to C50 each containing titanium, 50% purifying temperature of 342° C. or less could be achieved in the case where the mass ratio of palladium to platinum was within a range of 2 to 80 as shown in FIG. 7. Further, in the case where the mass ratio was within a range of 10 to 40, 50% purifying temperature of 330° C. to 331° C. could be achieved.

Regarding the catalysts C26 to C31, 50% purifying temperature of 372° C. or less could be achieved in the case where the mass ratio of lanthanum to precious metal was within a range of 0.2 to 10 as shown in FIG. 8. Further, in the case where the mass ratio was within a range of 0.2 to 6, 50% purifying temperature of 356° C. or less could be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An exhaust gas-purifying catalyst obtained by preparing a first particles precursor, co-precipitating the first particles precursor together with a second particles precursor and a third particles precursor to obtain a co-precipitate, and sintering the co-precipitate, comprising:

first particles of oxygen storage material having an average particle diameter of 0.005 μm to 0.1 μm;

second particles of one or more acidic oxides interposed between the first particles and having an average particle diameter of 0.005 μm to 0.050 μm; and third particles of one or more precious metal elements interposed between the first particles and having an average particle diameter of 0.5 nm to 10 nm, wherein the one or more precious metal elements are palladium and platinum and a mass ratio of palladium to platinum falls within a range of 10 to 40, wherein a spectrum of a first characteristic X-ray intensity for one of constituent elements of the one or more acidic oxides other than oxygen and a spectrum of a second characteristic X-ray intensity for one of the one or more precious metal elements are obtained by performing a line analysis using energy-dispersive X-ray spectrometry along a line having a length of 500 nm, and a correlation coefficient σ(AO,PM) calculated from a mean value $I_{AO}(Av)$ of the first characteristic X-ray intensity and a mean value $I_{PM}(Av)$ of the second characteristic X-ray intensity obtained along the line having a length of 500 nm, and a mean value $I_{AO}(n)$ of the first characteristic X-ray intensity and a mean value $I_{PM}(n)$ of the second characteristic X-ray intensity that are obtained for an n-th interval of 25 intervals arranged in the line and each having a length of 20 nm, respectively, is 0.70 or more.

2. The exhaust gas-purifying catalyst according to claim 1, wherein the one or more acidic oxides are oxide(s) containing at least one of titanium, silicon and tungsten.

3. The exhaust gas-purifying catalyst according to claim 2, wherein the one or more acidic oxides contains titanium, the one or more precious metal elements includes palladium, and the first and second characteristic X-ray intensities are characteristic X-ray intensities for titanium and palladium, respectively.

4. The exhaust gas-purifying catalyst according to claim 3, comprising two or more acidic oxides, or two or more precious metal elements, or two or more acidic oxides and two or more precious metal elements, wherein a spectrum of a first characteristic X-ray intensity for each constituent element of each acidic oxide other than oxygen and a spectrum of a second characteristic X-ray intensity for each precious metal element that are obtained by performing a line analysis using energy-dispersive X-ray spectrometry along a length of 500 nm have a correlation coefficient σ(AO,PM) of 0.70 or more.

5. The exhaust gas-purifying catalyst according to claim 4, wherein a ratio of mass of acidic oxides to total mass of the first to third particles falls within a range of 0.1% to 3% by mass.

6. The exhaust gas-purifying catalyst according to claim 5, wherein a ratio of mass of the one or more acidic oxides to mass of the precious metal elements falls within a range of 0.2 to 6.

7. The exhaust gas-purifying catalyst according to claim 1, comprising two or more acidic oxides, two or more precious metal elements, or two or more acidic oxides and two or more precious metal elements, wherein a spectrum of a first characteristic X-ray intensity for each constituent element of each acidic oxide other than oxygen and a spectrum of a second characteristic X-ray intensity for each precious metal element that are obtained by performing a line analysis using energy-dispersive X-ray spectrometry along a length of 500 nm have a correlation coefficient σ(AO,PM) of 0.70 or more.

8. The exhaust gas-purifying catalyst according to claim 7, wherein a ratio of mass of acidic oxides to total mass of the first to third particles falls within a range of 0.1% to 3% by mass.

9. The exhaust gas-purifying catalyst according to claim 8, wherein a ratio of mass of the acidic oxides to mass of the precious metal elements falls within a range of 0.2 to 6.

10. The exhaust gas-purifying catalyst according to claim 1, comprising two or more acidic oxides, two or more precious metal elements, or two or more acidic oxides and two or more precious metal elements, wherein a spectrum of a first characteristic X-ray intensity for each constituent element of each acidic oxide other than oxygen and a spectrum of a second characteristic X-ray intensity for each precious metal element that are obtained by performing a line analysis using energy-dispersive X-ray spectrometry along a length of 500 nm have a correlation coefficient σ(AO,PM) of 0.70 or more.

11. The exhaust gas-purifying catalyst according to claim 1, wherein a ratio of mass of the one or more acidic oxides to total mass of the first to third particles falls within a range of 0.1% to 3% by mass.

12. The exhaust gas-purifying catalyst according to claim 1, wherein a ratio of mass of the one or more acidic oxides to mass of the one or more precious metal elements falls within a range of 0.2 to 6.

* * * * *